(12) United States Patent
Murasawa et al.

(10) Patent No.: US 8,357,864 B2
(45) Date of Patent: Jan. 22, 2013

(54) HANDLEBAR SWITCH ASSEMBLY

(75) Inventors: Naoki Murasawa, Wako (JP); Kota Nakahira, Wako (JP); Manabu Ichikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 12/766,636

(22) Filed: Apr. 23, 2010

(65) Prior Publication Data

US 2010/0270135 A1    Oct. 28, 2010

(30) Foreign Application Priority Data

Sep. 16, 2009  (JP) .................................. 2009-214403

(51) Int. Cl.
 *H01H 9/06* (2006.01)
(52) U.S. Cl. .................................................... 200/61.88
(58) Field of Classification Search ............... 200/61.88, 200/18, 329, 339, 553, 561–563, 61.27, 61.54, 200/61.57, 61.85, 61.87
See application file for complete search history.

(56) References Cited

U.S. PATENT DOCUMENTS

| | | | | |
|---|---|---|---|---|
| 4,847,454 A | * | 7/1989 | Hiruma | ........................ 200/61.85 |
| 7,402,767 B2 | * | 7/2008 | Tozuka et al. | ............... 200/61.54 |
| 2007/0199810 A1 | | 8/2007 | Ieda et al. | |

FOREIGN PATENT DOCUMENTS

| | | |
|---|---|---|
| EP | 1323955 A1 | 7/2003 |
| EP | 1524180 A2 | 4/2005 |
| JP | 2003/341376 A | 12/2003 |
| JP | 2007/50758 A | 3/2007 |
| JP | 4166474 | 10/2008 |

\* cited by examiner

*Primary Examiner* — Edwin A. Leon
(74) *Attorney, Agent, or Firm* — Birch, Stewart, Kolasch & Birch, LLP

(57) ABSTRACT

A handlebar switch assembly for enhancing operability of a shift-up switch and a shift-down switch separately provided on a switch case. Viewing a switch case from an axis line direction of a handlebar, four zones are defined with the axis line, a rear upper zone and a rear lower zone, both located opposite to an occupant, and a front upper zone and a front lower zone, both located on the vehicle front side. A first shift switch and a second shift switch are swing-type switches in which operating elements swing when a pushing force is applied. The shift-up switch is located in the front lower zone so as to orient one end of its operating element outward in the vehicle transverse direction and the shift-down switch is located in the rear lower zone so as to orient one end of its operating element outward in the vehicle transverse direction.

20 Claims, 22 Drawing Sheets

HANDLEBAR SWITCH ASSEMBLY

CROSS-REFERENCE TO RELATED APPLICATIONS

The present application claims priority under 35 USC 119 to Japanese Patent Application Nos. 2009-109140 filed on Apr. 28, 2009 and 2009-214403 filed on Sep. 16, 2009 the entire contents of which are hereby incorporated by reference.

FIELD OF THE INVENTION

The present invention relates to handlebar switch assemblies and more particularly to a handlebar switch assembly in which a shift switch for transmission gear shift is provided on a switch case adjacent to a handlebar grip.

DESCRIPTION OF BACKGROUND ART

A handlebar switch assembly is known wherein a shift-up switch and a shift-down switch for a transmission gear shift are separately provided on a switch case fitted to the handlebar of a motorcycle.

Japanese Patent No. 4166474 discloses a handlebar switch assembly in which a shift-up switch journalled to a swing shaft oriented along the vertical direction of the vehicle is located on the vehicle front side of a switch case and a shift-down switch journalled to a swing shaft oriented along the axis line direction of a handlebar grip is located on the vehicle lower side of the switch case.

However, in the handlebar switch assembly described in Japanese Patent No. 4166474, the shift-up switch is located almost at the same level as the height of the handlebar's axis line and it is necessary to move a forefinger toward the hand opening direction to a considerable extent when operating the shift-up switch while holding the handlebar grip. On the other hand, as for the shift-down switch, its pushing part is located in a more forward position of the vehicle than the axis line of the handlebar, protruding below the switch case, so there is a problem that the pushing surface is too remote from the thumb to operate it easily.

SUMMARY AND OBJECTS OF THE INVENTION

An object of an embodiment of the present invention is to address the above problem of the above related art and provide a handlebar switch assembly in which the operability of a shift-up switch and a shift-down switch, both separately provided on a switch case, is enhanced.

According to an embodiment of the present invention, a handlebar switch assembly (40, 200a) to be fixed on a handlebar (12) of a motorcycle (1), in which a first shift switch (60, 206) and a second shift switch (50, 208) for transmission gear shift are separately provided on a switch case (40a, 200a) having a plurality of switches for operation of various electric parts, the switch case (40a, 200a) is divided into four zones when viewed from an axis line (C) direction of the handlebar (12), a rear upper zone (RU) and a rear lower zone (RL) with respect to the axis line (C), both located opposite to an occupant, and a front upper zone (FU) and a front lower zone (FL), both located on a vehicle front side, the first shift switch (60, 206) and the second shift switch (50, 208) are swing-type switches in which operating elements (60a, 50a, 206a, 208a) swing when a pushing force is applied, the first shift switch (60, 206) for either shift-up or shift-down operation is located in the front lower zone (FL) so as to orient one end of the operating element (60a, 206a) outward in a vehicle transverse direction, and the second shift switch (50, 208) for the other operation, shift-up or shift-down operation, is located in the rear lower zone (RL) so as to orient one end of the operating element (50a, 208a) outward in the vehicle transverse direction.

According to an embodiment of the present invention, four zones are formed wherein a first imaginary line (P) for division between an occupant side and a vehicle front side and a second imaginary line (L) perpendicular to the first imaginary line (P) for division between a vehicle upper side and a vehicle lower side are defined. The first shift switch (60, 206) is remote from the first imaginary line (P) and adjacent to the second imaginary line (L), and the second shift switch (50, 208) is adjacent to the first imaginary line (P) and remote from the second imaginary line (L).

According to an embodiment of the present invention, when the axis line (C) of the handlebar (12), the first imaginary line (P) and the second imaginary line (L) are perpendicular to each other and a direction of the first imaginary line (P) is defined as a height direction of the switch case (40a, 200a) and a direction of the second imaginary line (L) is defined as a front-back direction of the switch case (40a, 200a), swing shafts (62, 52, 222, 211) of the first shift switch (60, 206) and the second shaft switch (50, 208) are oriented along the height direction of the switch case (40a, 200a).

According to an embodiment of the present invention, when the switch case (40a, 200a) is seen from a vehicle rear side, the swing shaft (52, 211) of the second shift switch (50, 208) is tilted by a given angle (0, 02) with respect to the first imaginary line (P) wherein a tip of the operating element (50a, 208a) of the second shift switch (50, 208) is close to the axis line (C) of the handlebar (12).

According to an embodiment of the present invention, the switch case (40a, 200a) is comprised of a front case half (46, 202) located on the vehicle front side and a rear case half (45, 201) located on the occupant side. Switch bodies (54, 64, 206s, 208s) of the first shift switch (60, 206) and the second shift switch (50, 208) are each fixed on the front case half (46, 202) on the vehicle front side with respect to the first imaginary line (P), and the swing shaft (52, 211) of the second shift switch (50, 208) is located on the vehicle rear side with respect to the first imaginary line (P).

According to an embodiment of the present invention, the plurality of switches for operation of various electric parts at least include an optical axis changeover switch (41, 204) for headlight, a horn switch (42, 205) and a turn signal switch (43, 207) and are arranged in a vertical direction of the switch case (40a, 200a) so as not to overlap each other in the axis line (C) direction of the handlebar (12), and among the plural switches (41, 42, 43, 204, 205, 207) the switch (43, 205) adjacent to the second shift switch (50, 208) is operated in a manner different from a manner in which the second shift switch (50, 208) is operated.

According to an embodiment of the present invention, the operating element (50a, 208a) of the second shift switch (50, 208) is housed in a dent (45a, 213a) made in a bottom of the switch case (40a, 200a) outward in the vehicle transverse direction so as not to protrude toward the occupant side and downward from a surface of the switch case (40a, 200a).

According to an embodiment of the present invention, among surfaces constituting the dent (45a, 213a), a wall surface opposite to an upper surface of the operating element (50a, 208a) of the second shift switch (50, 208) has a tilted surface (49, 231) whose distance from the operating element (50*a*, 208*a*) increases outward in the vehicle transverse direction.

According to an embodiment of the present invention, wherein at least one of the first shift switch (60, 206) and the second shift switch (50, 208) has a tapered portion (61, 51, 206*k*, 208*k*) in which a height of the operating element (60*a*, 50*a*, 206*a*, 208*a*) decreases outwardly in the vehicle transverse direction.

According to an embodiment of the present invention, the second shift switch (50, 208) and the plurality of switches are arranged on the switch case (40*a*, 200*a*) fitted to the handlebar (12) on the left in the vehicle transverse direction from above in the order of the optical axis changeover switch (41, 204), horn switch (42, 205), turn signal switch (43, 207) and second shift switch (50, 208), and the horn switch (42, 205) is a swing-type switch which swings around a swing shaft (48, 209) located near the handlebar (12) toward the axis line of the handlebar (12) and its pushing surface is so formed that its protrusion toward the occupant side gradually increases toward a vehicle center from the swing shaft (48, 209) side.

According to an embodiment of the present invention, the first shift switch and the second shift switch are swing-type switches in which operating elements swing when a pushing force is applied, the first shift switch for either shift-up or shift-down operation is located in the front lower zone so as for one end of the operating element to extend outward in a vehicle transverse direction. The second shift switch for the other operation, shift-up or shift-down operation, is located in the rear lower zone so as for one end of the operating element to extend outward in the vehicle transverse direction, so the first and second shift switches can be shift switches which are operated by opening a thumb and forefinger and moving them in their closing direction while holding the handlebar grip. In addition, since the first shift switch is located in the front lower zone and the second shift switch is located in the rear lower zone, the opening distance between the thumb and forefinger for each shift switch operation can be shorter and the operability of each shift switch can be thus improved.

According to an embodiment of the present invention, the first shift switch is remote from the first imaginary line and adjacent to the second imaginary line. The second shift switch is adjacent to the first imaginary line and remote from the second imaginary line. Thus, the first shift switch is located on the vehicle front side near the handlebar axis line in a higher position and the second shift switch is located on the vehicle front side near the handlebar axis line in a lower position. Consequently, while holding the handlebar grip, the first shift switch can be operated without moving the forefinger to a great extent and the second shift switch can be operated without moving the thumb to a great extent.

According to an embodiment of the present invention, when the axis line of the handlebar, the first imaginary line and the second imaginary line are perpendicular to each other and a direction of the first imaginary line is defined as a height direction of the switch case and a direction of the second imaginary line is defined as a front-back direction of the switch case, the swing shafts of the first shift switch and the second shaft switch are oriented along the height direction of the switch case, so the first and second shift switches can be operated by moving the fingers in the handlebar gripping direction, namely the first clenching direction and their operability can be thus improved.

According to the fourth feature, when the switch case is seen from the vehicle rear side, the swing shaft of the second shift switch is tilted by a given angle with respect to the first imaginary line wherein a tip of an operating element of the second shift switch is close to the axis line of the handlebar. Thus, the second shift switch can be operated near the handlebar grip, which means that it can be easily operated with the thumb, a relatively short finger.

According to an embodiment of the present invention, the switch case is comprised of a front case half located on the vehicle front side and a rear case half located on the occupant side, the switch bodies of the first shift switch and the second shift switch are each fixed on the front case half on the vehicle front side with respect to the first imaginary line, and the swing shaft of the second shift switch is located on the vehicle rear side with respect to the first imaginary line. Because the switch case is divided into the front case half and the rear case half, even when a plurality of switches for electric parts are to be provided on the switch case, the switch bodies can be dispersedly fixed on both the case halves and thus the switches can be easily arranged by the best use of the switch case inner space. Thus, the assemblability of the switch case can be improved.

Furthermore, since the switch body of the second shift switch is fixed on the front case half and the swing shaft of the second shift switch is located on the vehicle rear side with respect to the first imaginary line, the second shift switch's operating part to be pushed can be located near the thumb, thereby improving operability.

According to an embodiment of the present invention, the optical axis changeover switch, horn switch and turn signal switch are arranged in the vertical direction of the switch case so as not to overlap each other in the axis line direction of the handlebar and among the plurality of switches the switch adjacent to the second shift switch is operated in a manner different from a manner in which the second shift switch is operated, so when the other switches are vertically arranged, the switch case can be more compact than when they are arranged along the handlebar axis line because the switch case need not stretch along the handlebar axis line. In addition, since the manner in which the second shift switch is operated is different from the manner in which the other switch adjacent to the second shift switch is operated, it is easy to discriminate between them, thereby preventing an erroneous operation.

According to an embodiment of the present invention, the operating element of the second shift switch is housed in a dent made in a bottom of the switch case outward in the vehicle transverse direction so as not to protrude toward the occupant side and downward from a surface of the switch case, so when operating another switch located above the second shift switch while holding the handlebar grip, the thumb can be prevented from touching the second shift switch.

According to an embodiment of the present invention, among surfaces constituting the dent, a wall surface opposite to an upper surface of the operating element of the second shift switch has a tilted surface whose distance from the operating element increases outward in the vehicle transverse direction, so when operating the second shift switch, it can be smoothly operated without the thumb getting caught on an angular edge of the dent.

According to an embodiment of the present invention, at least one of the first shift switch and the second shift switch has a tapered portion in which a height of the operating element decreases outward in the vehicle transverse direction, so even when the tip of either shift switch protrudes from the switch case outward in the vehicle transverse direction, it is easy to put a fingertip on the tip of the shift switch, thereby improving operability.

According to an embodiment of the present invention, the horn switch is a swing-type switch which swings around a swing shaft located near the handlebar toward the axis line of the handlebar and its pushing surface is so formed that its protrusion toward the occupant side gradually increases toward a vehicle center from the swing shaft side, so the amount of protrusion of the transversely outward end of the horn switch from the switch case decreases and even when the thumb is moved vertically, the thumb tip hardly gets caught on the horn switch. This prevents the horn switch from being erroneously operated and even when several switches are arranged vertically on the switch case, each switch can be smoothly operated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
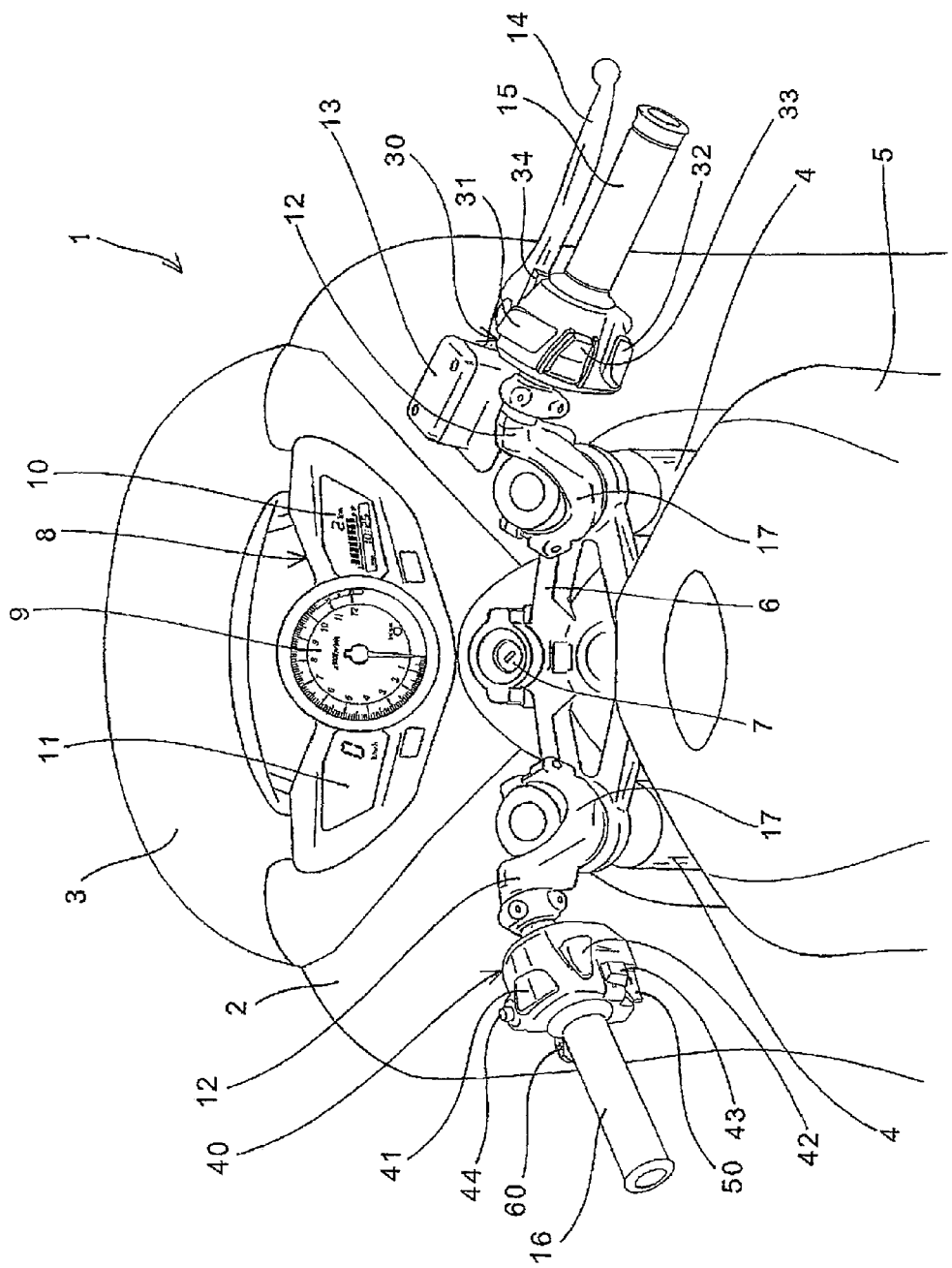
FIG. 1 is a fragmentary enlarged view of a motorcycle to which a handlebar switch assembly according to a first embodiment of the invention is applied.

Preferred embodiments of the invention will be described in detail referring to drawings. FIG. 1 is a fragmentary enlarged view of a motorcycle 1 to which a handlebar switch assembly according to a first embodiment of the invention is applied. FIG. 1 illustrates a handlebar and its vicinity as looked down from behind and above the vehicle body and illustrates almost the same as what an occupant (rider) seated on the seat sees.

The vehicle front side of a pair of left and right handlebars 12 for steering a front wheel (not shown) is covered by a cowling 2 as an exterior component. A transparent or translucent windbreak screen 3 is attached to the center top of the cowling 2 and located below the screen is a meter unit 8 having a liquid crystal panel 10 which can show a tachometer 9, a speed meter 11, a fuel gauge, a clock and so on.

The front wheel of the motorcycle 1 is rotatably journalled to the lower ends of a pair of left and right front forks 4 and the upper parts of the front forks 4 are coupled and fixed by a top bridge 6 fitted with a key cylinder 7. The top bridge 6 is turnably fitted to the body frame of the motorcycle 1 through a steering system (not shown) and the handlebars 12 are fixed on the upper ends of the front forks 4 through handlebar clamps 17. A fuel tank 5 is located between the top bridge 6 and the seat (not shown).

Handlebar grips 15 and 16, which are made of cylindrical rubber or the like and to be held by an occupant, are fitted to the left and right handlebars 12. A front wheel brake lever 14 is located on the vehicle front side of the right handlebar grip 15 and a reservoir tank 13 for storing a brake system working fluid is fitted to the base of the front wheel brake lever 14. Also, the right handlebar grip 15 is so supported turnably with respect to the handlebar 12 and by turning it, a throttling operation for a driving power source is performed.

The motorcycle 1 according to this embodiment is equipped with an automatic transmission which eliminates the need for clutch operation and is designed to be able to run in an automatic run mode which only requires throttling operation or in a semiautomatic run mode which allows free gear shift operation. In the semiautomatic run mode, a gear shift operation can be performed by a shift-up/shift-down switch provided on a handlebar switch assembly which will be described later. The automatic transmission may be a sequential multi-stage transmission in which the transmission and clutch are driven by an actuator, or an HMT (Hydraulic Mechanical Transmission), or a belt continuously variable transmission.

A handlebar switch assembly 30 having operation switches for various electric parts is fitted to the right handlebar 12 adjacently to the vehicle center side of the handlebar grip 15. The handlebar switch assembly 30 has an engine stop switch 31, a neutral/drive changeover switch 32, a starter switch 33 and a run mode changeover switch 34. On the other hand, the left handlebar switch assembly 40 has a headlight optical axis changeover switch 41, a horn switch 42, a turn signal switch 43, a hazard lamp switch 44, and a shift-down switch 50 and a shift-up switch 60 for automatic transmission gear shift.

Figure 2:
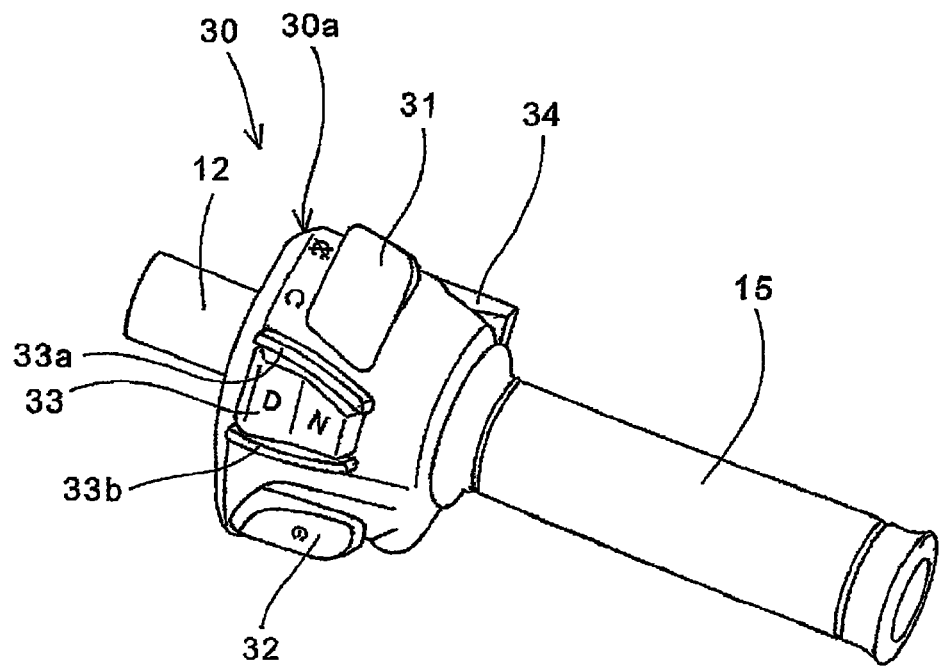
FIG. 2 is an enlarged view of the right handlebar switch assembly and its vicinity.

FIG. 2 is an enlarged view of the right handlebar switch assembly and its vicinity. The same reference numerals as above denote the same or equivalent elements. The handlebar switch assembly 30 is structured as a box-like switch case 30a of resin or similar material to which several switches for operation of various electric parts are fitted. The run mode changeover switch 34, which is located on the vehicle front side and of the swing push type (returns to the initial position upon release of a pushing force), is operated by pulling it (toward the occupant) with the forefinger of the right hand and each time it is operated, switching is made between the automatic run mode and the semiautomatic run mode. The engine stop switch 31, which is of the seesaw type or held in one or the other position unless an operating force is applied, is used to stop operation of the igniter by turning it to the off position during operation of the engine for emergency stop of the engine.

The neutral/drive changeover switch 33, which is almost at the same height level as the axis line of the handlebar 12 in the vehicle vertical direction, is of the seesaw push type (returns to the neutral position upon release of a pushing force) so that when the motorcycle 1 is at a stop, switching is made between the neutral (N) and first speed (D) positions by pushing the D side or N side with the thumb. In this embodiment, when the D side is pushed while the automatic run mode is chosen, the mode is changed to a sport automatic run mode (S mode) in which the driving power is more emphasized than in the normal automatic run mode. Partition plates 33a and 33b are provided on the top and bottom of the neutral/drive changeover switch 33 in order to prevent an erroneous operation.

When the ignition switch is ON and the transmission is in the neutral position, the push type starter switch 32, located in the lowest position of the handlebar switch assembly 30, is used to start the engine.

Figure 3:
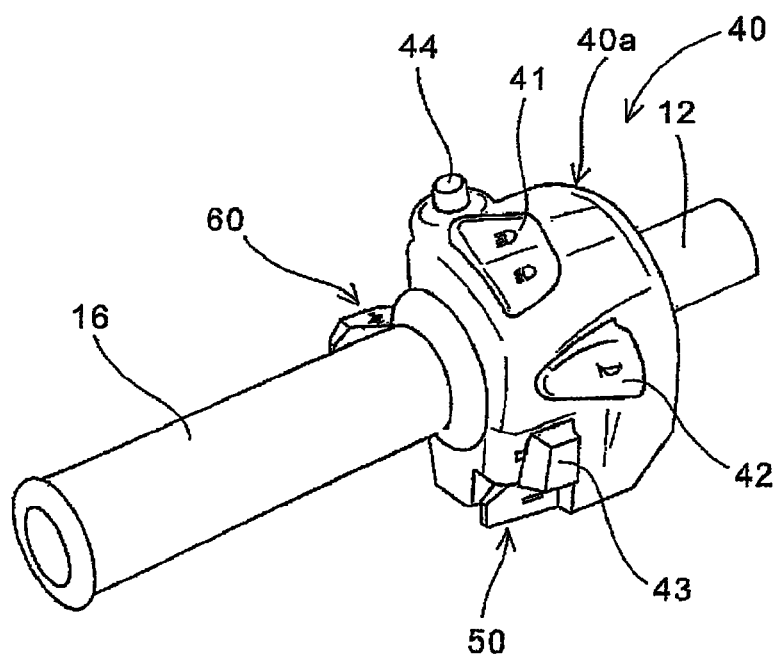
FIG. 3 is an enlarged view of the left handlebar switch assembly and its vicinity.

FIG. 3 is an enlarged view of the left handlebar switch assembly and its vicinity. The same reference numerals as above denote the same or equivalent elements. The handlebar switch assembly 40 is structured as a box-like switch case 40a of resin or similar material to which several switches for operation of various electric parts and a shift-up switch 60 and a shift-down switch 50 are fitted.

The horn switch 42 of the swing push type is located almost at the same height level as the axis line of the handlebar 12 in the vehicle vertical direction, and the optical axis changeover switch 41 of the seesaw type is located above it. The hazard lamp switch 44, which is turned on or off by making the cylindrical operating element protruded or depressed, is located on the vehicle front side of the optical axis changeover switch 41. Also, the turn signal switch 43, which activates the left and right turn signal lamps by tilting its operating element, is located below the horn switch 42.

In the handlebar switch assembly 40 according to this embodiment, the shift-up switch (first shift switch) 60 of the swing push type is located on the vehicle front side and the shift-down switch (second shift switch) 50 of the swing push type is located below the turn signal switch 43. The shift-up switch 60 is operated by being pulled (toward the occupant) with the forefinger and the shift-down switch 50 is operated by being pushed toward the vehicle front side with the thumb. Therefore, both the switches can be operated by moving the hand in the clenching direction, so that it is easy to impress a force upon the switches and high operability is achieved. Alternatively, it is also possible that the first shift switch on the vehicle front side is a shift-down switch and the second shift switch in the lower position is a shift-up switch.

Figure 4:
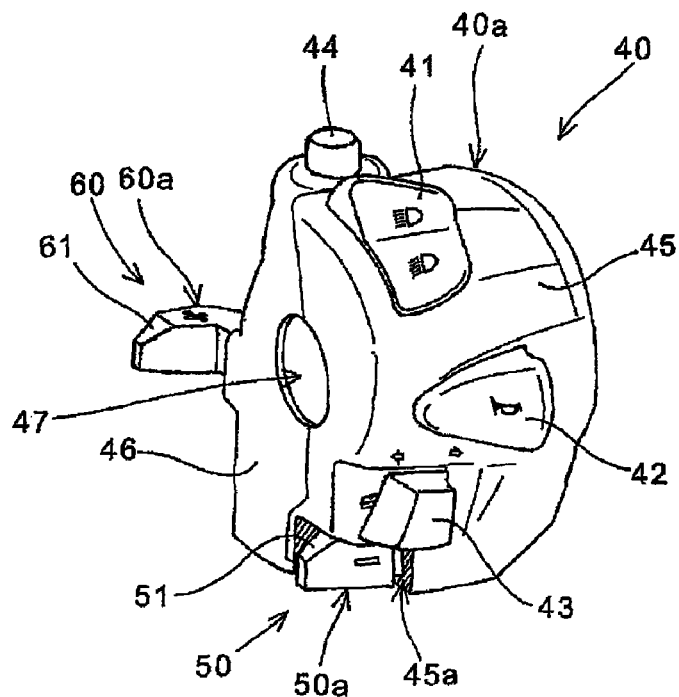
FIG. 4 is a perspective view of the left handlebar switch assembly.
Figure 5:
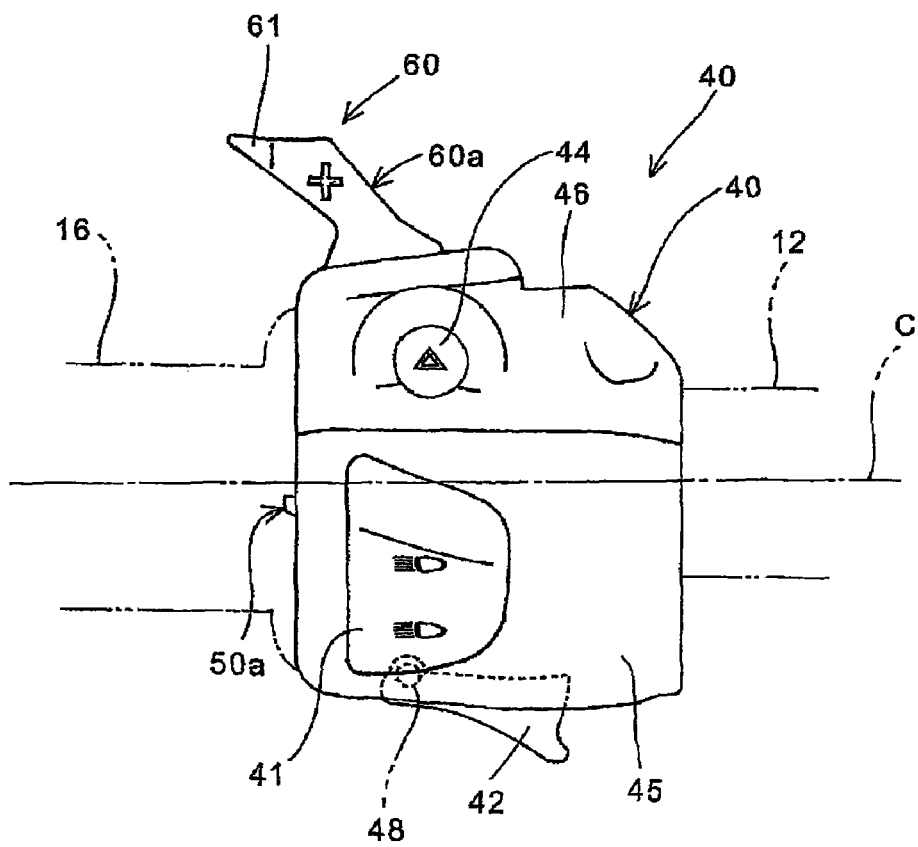
FIG. 5 is a top view of the left handlebar switch assembly.

FIG. 4 is a perspective view of the left handlebar switch assembly 40. FIG. 5 is a top view of the handlebar switch assembly 40. The same reference numerals as above denote the same or equivalent elements. The switch case 40a is comprised of a rear case half 45 on the occupant side and a front case half 46 on the vehicle front side and fixed in a prescribed place on the handlebar 12 by inserting the handlebar 12 into an insertion hole 47 and fastening both the case halves. The right handlebar switch assembly 30 is also structured in the same way.

The shift-up switch 60 (shift-down switch 50) has one end of the operating element 60a (50a) journalled to the swing axis (see FIG. 6) oriented along the height direction of the switch case 40a and the other end, namely the pushing part side, extending outward in the vehicle transverse direction. The upper surface of the operating element 60a (50a) has a tapered portion 61 (51) whose height decreases outward in the vehicle transverse direction. This makes it easy to put the forefinger and thumb on the operating elements 60a and 50a from above respectively.

The shift-down switch 50 is housed in a dent 45a (hatched in the figure) made at the bottom of the switch case 40a outward in the vehicle transverse direction. The dent 45a has such a shape that a virtually rectangular solid is cut off from the left bottom corner of the switch case 40 when the case is seen from the front. Since the shift-down switch 50 is housed in this dent 45a, the operating element 50a does not protrude toward the occupant or downward from the surface of the switch case 40a.

Referring to FIG. 5, the operating element 50a of the shift-down switch 50 has its tip protruding slightly outwardly in the vehicle transverse direction of the switch case 40a on the occupant side with respect to the axis line C of the handlebar 12 and handlebar grip 16.

The horn switch 42 swings around a swing shaft 48 provided at an outward end of it in the vehicle transverse direction. The swing shaft 48 is located almost perpendicularly to the axis line C and the horn switch 42 is swung by pushing its operating surface on the vehicle inward side toward the axis line C, namely toward the vehicle front side. This reduces the possibility that the horn switch 42 is unintentionally activated during a run with the thumb put on a part of the horn switch 42 near the handlebar grip 16, because the horn switch 42 is activated by pushing a part thereof near the vehicle center. Also, when activating the horn switch 42, it can be easily pushed by moving the thumb slightly toward the vehicle inward direction.

Furthermore, the horn switch 42 is so shaped that its longitudinal side is oriented along the axis line C and the amount of its protrusion from the surface of the rear case half 45 increases inward in the vehicle transverse direction. Consequently, when moving the thumb up and down while holding the handlebar grip 16, the thumb tip hardly gets caught on the horn switch 42 and it is easy to know which part of the horn switch 42 is in touch with the thumb tip.

Figure 6:
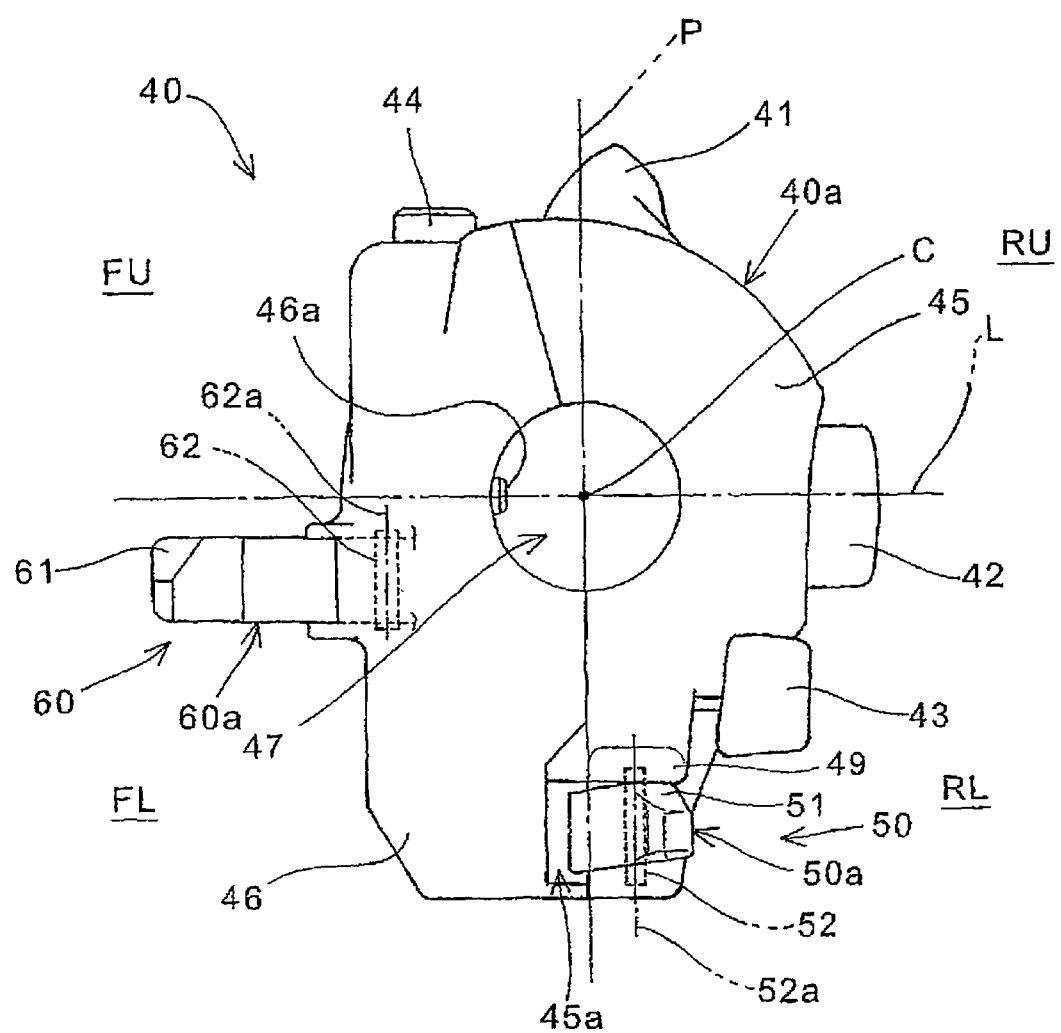
FIG. 6 is a side view of the switch case as seen from the axis line direction of the handlebar.

FIG. 6 is a side view of the switch case 40a when viewed from the axis line direction of the handlebar 12. The same reference numerals as above denote the same or equivalent elements. Usually the handlebar switch assembly 40 is disposed so that the operating surface of the horn switch 42 faces the occupant (rider). The handlebar switch assembly 40 is fitted to the handlebar 12 by aligning an engaging projection 46a formed on the front case half 46 with a positioning hole (not shown) in the handlebar 12 to engage it with the hole, sandwiching the handlebar 12 between the rear case half 45 and front case half 46 and coupling both the case halves with tapping screws, etc. The diameter of the insertion hole 47 should be almost equal to the diameter of the handlebar 12.

FIG. 6 illustrates that the handlebar switch assembly 40 is divided into four zones when viewed from the axis line direction of the handlebar 12: a rear upper zone RU and a rear lower zone RL, both located near the occupant, and a front upper zone FU and a front lower zone FL, both located on the vehicle front side. These four zones are demarcated by a first imaginary line P passing through the axis line C and bisecting the assembly longitudinally and a second imaginary line L crossing the first imaginary line P perpendicularly and bisecting the assembly vertically, and in this embodiment the direction of the first imaginary line P is defined as the height direction of the switch case 40a and the direction of the second imaginary line L is defined as the front-back direction of the switch case 40a.

The handlebar switch assembly 40 is generally attached to the handlebar 12 in a way that the second imaginary line L is slightly tilted upward to the right from the horizontal line though there is some difference in handlebar shape, etc. depending on the vehicle type (sport model, American model, etc). Consequently the operating surface of the horn switch 42 faces the occupant.

In the handlebar switch assembly 40 according to this embodiment, the shift-up switch 60 is located in the front lower zone FL remotely from the first imaginary line P and adjacently to the second imaginary line L. Consequently the operating element 60a of the shift-up switch 60 is on the vehicle front side of the switch case 40a in a slightly lower position than the secondary imaginary line L so that it is possible to put the forefinger on the operating element 60a from above with minimum motion while holding the handlebar grip 16.

Also, the shift-down switch 50 is located in the rear lower zone RL adjacently to the first imaginary line P and remotely from the second imaginary line L. Consequently the operating element 50a of the shift-down switch 50 is on the vehicle lower side of the switch case 40a in a slightly more rearward position than the first imaginary line P so that it is possible to put the thumb on the operating element 50a with minimum motion while holding the handlebar grip 16.

The shift-up switch 60 and shift-down switch 50 are journalled to swing shafts 62 and 52 oriented along the height direction of the switch case 40a, namely the first imaginary line P, and their centerlines 62a and 52a are almost parallel to the first imaginary line P.

Figure 7:
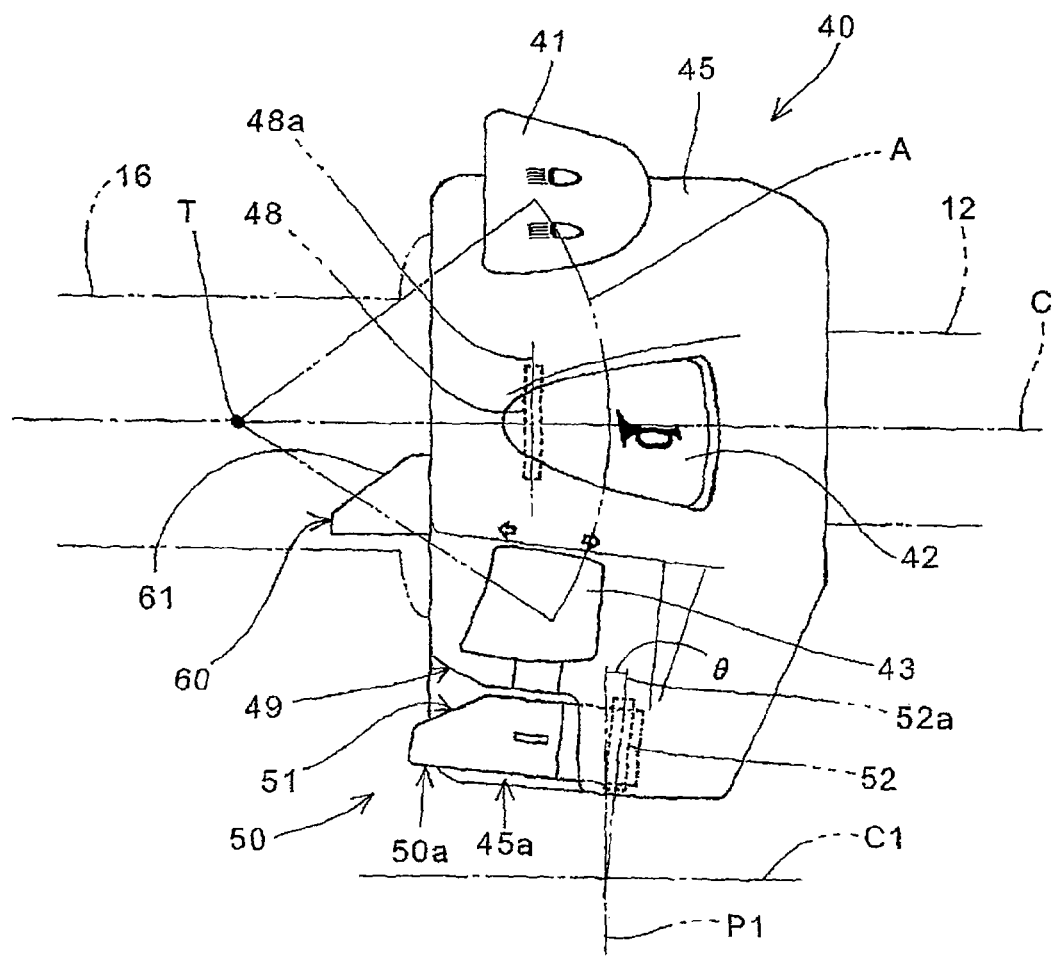
FIG. 7 is a front view of the switch case.

FIG. 7 is a front view of the switch case 40a. The same reference numerals as above denote the same or equivalent elements. The swing shaft 52 of the shift-down switch 50 is tilted in a way that the transversely outward side of the operating element 50a is close to the axis line C of the handlebar 12. Concretely, the centerline 52a of the swing shaft 52 is tilted clockwise by a given angle θ with respect to an imaginary line P1 perpendicular to an imaginary line C1 parallel to the axis line C when the switch case 40a is seen from the front.

Also, in this embodiment, the optical axis changeover switch 41, horn switch 42, turn signal switch 43 and shift-down switch 50 are arranged along the vertical direction of the switch case 40 in a manner that they do not overlap in the axis line C direction of the handlebar 12. When operating the switches provided on the left switch case 40a, generally the thumb tip of the left hand will move up and down along an arc A with a swing center T as its center. The optical axis changeover switch 41, horn switch 42 and turn signal switch 43 are located in a way to overlap the arc A, so the switches can be easily operated by moving the thumb while holding the handlebar grip 16.

As mentioned above, since the swing shaft 52 of the shift-down switch 50 is tilted by the given angle θ, as the thumb tip moves toward the top of the operating element 50a along the arc A, the swing direction of the thumb is close to the swing direction of the shift-down switch 50, so that an easy operability can be achieved.

Furthermore, in the dent 45a which houses the shift-down switch 50, the surface opposite to the upper surface of the operating element 50a has a tilted surface 49 whose distance from the operating element 50a increases outwardly in the vehicle transverse direction. This tilted surface 49 eliminates an angular edge on which the thumb may get caught when the shift-down switch 50 is operated, thereby permitting a smoother operation.

In addition, since the operating element 50a of the shift-down switch 50 is designed so as not to protrude toward the occupant (vehicle rear side) and downward from the switch case 40a surface, the thumb hardly touches the operating element 50a when operating the turn signal switch 43, horn switch 42 or the like while holding the handlebar grip 16, thereby reducing the possibility of an erroneous operation.

On the other hand, the horn switch 42 is virtually in the shape of a fan in which the distance between its upper and lower contour lines gradually increases inward in the vehicle transverse direction. Due to this shape, the pushing surface area is large enough, so the horn switch 42 can be easily pushed and the switch shape can be easily known by moving the thumb from side to side. Furthermore, since the area of the transversely outward portion of the horn switch 42 is smaller, the thumb tip is less likely to get caught on the horn switch 42 during vertical motion of the thumb. The centerline 48a of the swing shaft 48 of the horn switch is almost parallel to the imaginary line P1.

Figure 8:
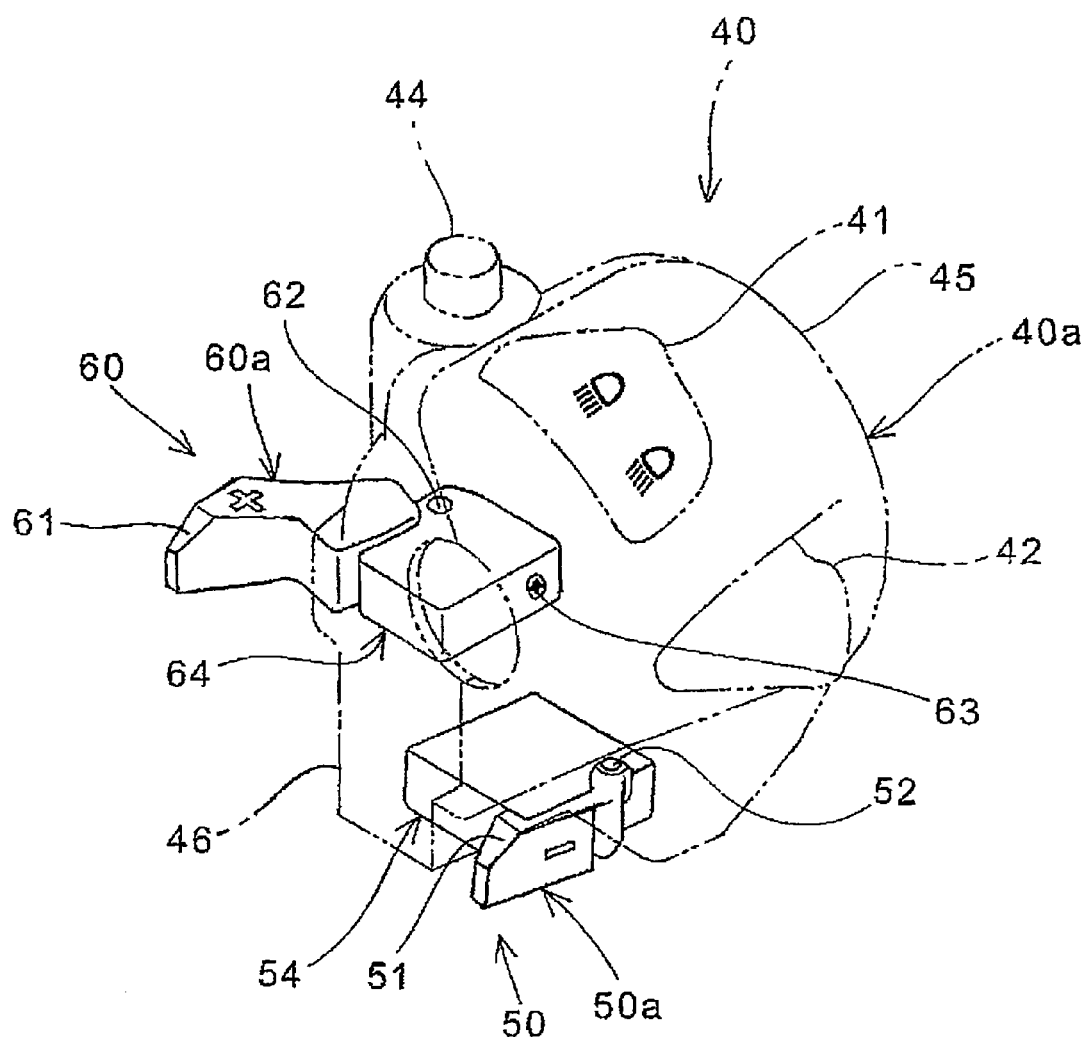
FIG. 8 is a partially see-through perspective view of the handlebar switch assembly.
Figure 9:
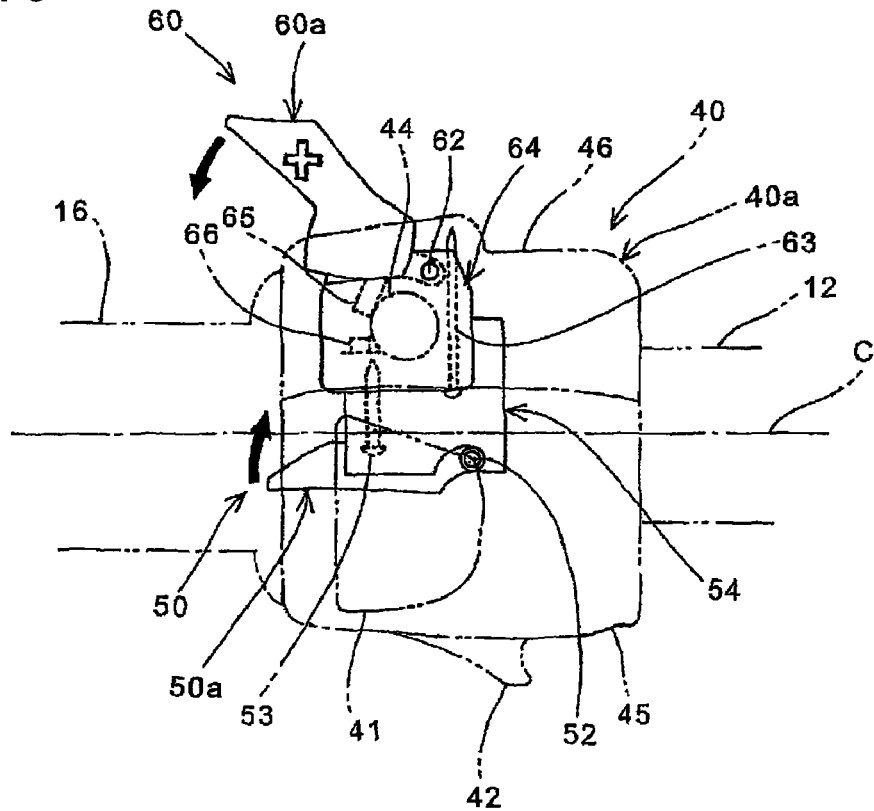
FIG. 9 is a partially see-through top view of the handlebar switch assembly.

FIG. 8 is a partially see-through perspective view of the handlebar switch assembly 40. FIG. 9 is a partially see-through top view of the handlebar switch assembly 40. The same reference numerals as above denote the same or equivalent elements. In the shift-up switch 60, the operating element 60a is journalled to the switch body 64 through the swig shaft 62. Similarly in the shift-down switch 50, the operating element 50a is journalled to the switch body 54 through the swig shaft 52.

Referring to FIG. 9, the operating element 60a of the shift-up switch 60 has a projection 65 oriented toward the vehicle rear side and as the operating element 60a swings, this projection 65 pushes a micro switch 66 to transmit a shift-up signal. The shift-up switch 60 is structured so that as the occupant decreases his/her operating force, it returns to its initial position as shown in FIG. 9 by the elastic force of an elastic member, etc. The shift-down switch 50 is also structured in the same way.

Both the switch bodies 64 and 54 are fixed on the front case half 46 by fastening members 63 and 53 respectively. Consequently, both the switch bodies 64 and 54 overlap each other when the switch case 40a is seen from above.

Figure 10:
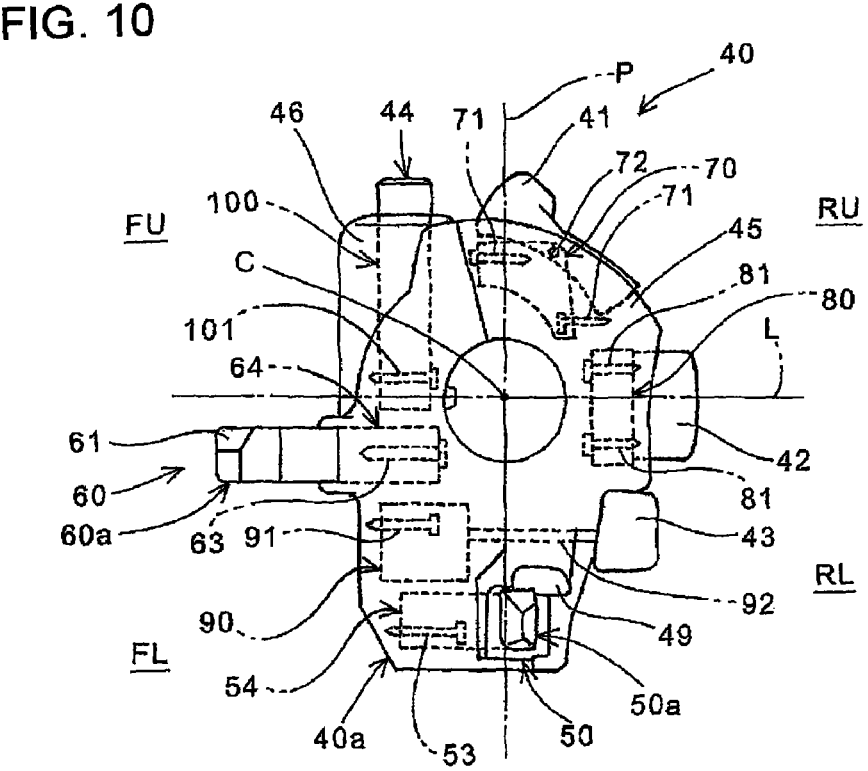
FIG. 10 is a partially see-through side view of the switch case as seen from the axis line direction of the handlebar.
Figure 11:
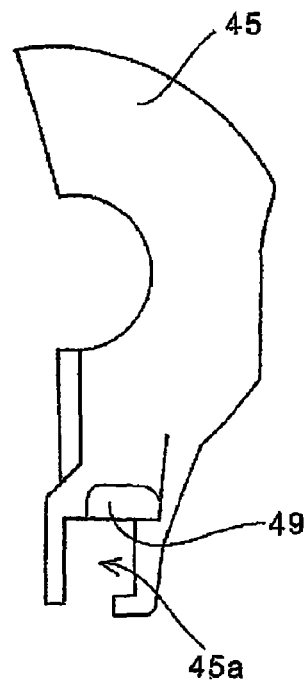
FIG. 11 is a side view of the rear case half.
Figure 12:
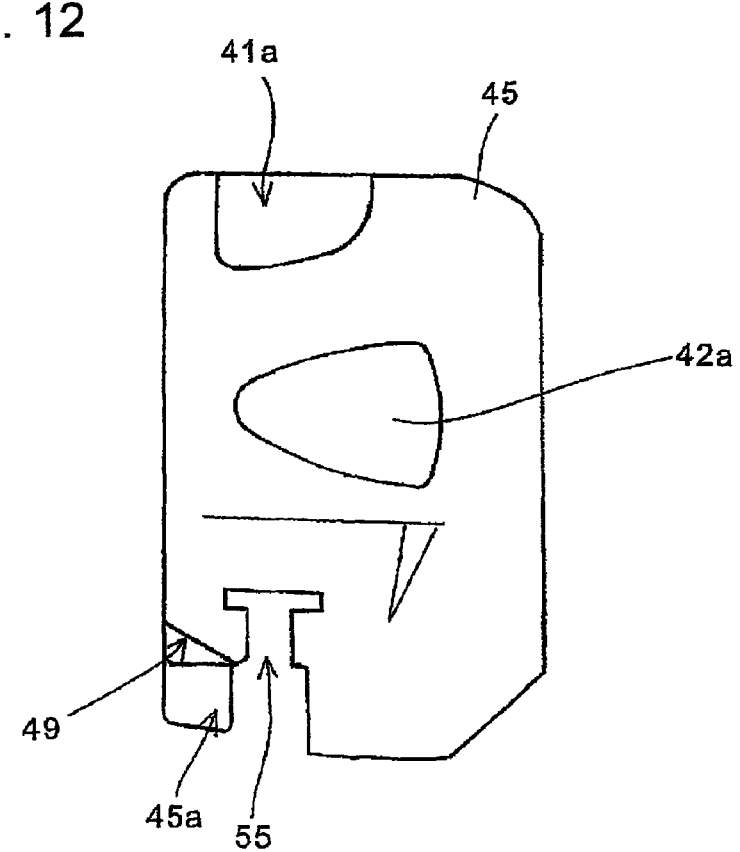
FIG. 12 is a front view of the rear case half.

FIG. 10 is a partially see-through side view of the switch case 40a as seen from the axis line direction of the handlebar 12. FIG. 11 is a side view of the rear case half 45 and FIG. 12 is a front view of the rear case half 45. The same reference numerals as above denote the same or equivalent elements. As mentioned above, the bodies 64 and 54 of the shift-up and shift-down switches 60 and 50 are fixed on the front case half 46 by fastening members 63 and 53 respectively. The switch body 100 of the hazard lamp switch 44 is fitted to the front case half by a fastening member 101 and the switch body 90 of the turn signal switch 43 is fixed on the front case half by a fastening member 91. On the other hand, the switch body 70 of the headlight optical axis changeover switch 41 is fixed on the rear case half 45 by fastening members 71 and the switch body 80 of the horn switch 42 is fixed on the rear case half 45 by fastening members 81.

As explained above, in the handlebar switch assembly 40 according to this embodiment, a plurality of switches are dispersedly arranged on the front and rear case halves so as to make the best use of the inner space for the purpose of compactness of the switch case 40a. As for the shift-down switch 50, since its switch body 54 lies on the front case half 46, the switch body 54 is on the vehicle front side with respect to the first imaginary line P and the operating surface of its operating element 50a can be on the vehicle rear side with respect to the first imaginary line P, thereby achieving both effective use of the inner space and high operability.

Furthermore, in this embodiment, the turn signal switch 43, located above and near the shift-down switch 50, is of the transversely inclining type which is inclined in the direction of the axis line C of the handlebar 12 and is different in the manner of operation from the shift-down switch 50, which is of the swing push type, or to be pushed toward the vehicle front side. Therefore, it is easy to discriminate between these switches, preventing them from being erroneously operated.

Referring to FIGS. 11 and 12, the rear case half 45 is an integrally molded component of resin or similar material like the front case half 46 and has an insertion hole 41a through which the operating element of the optical axis changeover switch 41 can be seen, an insertion hole 42a through which the operating element of the horn switch 42 can be seen, and a cut 55 which limits the inclination range of the inclination shaft of the turn signal switch 43. This cut 55 is open toward the vehicle lower side, so the rear case half 45 can be fastened to the front case half 46 with the turn signal switch 43 fixed on the front case half 46 and even when a total of six switches are to be provided, it is easy to assemble the handlebar switch assembly 40.

The tilted surface 49, tilted upward on the left as seen in FIG. 12 and formed on the upper wall of the dent 45a which houses the shift-down switch 50, has an angle almost equal to or somewhat larger than the angle of the thumb which is used to operate the shift-down switch 50. This prevents the thumb from getting caught on it and improves operability of the shift-down switch 50.

Next, a handlebar switch assembly according to a second embodiment of the present invention will be described referring to FIGS. 13 to 32. The difference from the handlebar switch assembly in the first embodiment is mainly the shapes of various switches though their functions and operation methods are basically the same. Therefore, it is the same as the handlebar switch assembly according to the first embodiment in many of the features of the present invention, for example, in that a first shift switch 206 and a second shift switch 208, both provided in a left handlebar switch assembly 200, are swing-type switches which swing toward the axis line C when a pressing force is applied, and the first shift switch 206 is located in the front lower zone FL so as to orient its operating element 206a outward in the vehicle transverse direction and the second shift switch 208 is located in the rear lower zone (RU) so as to orient its operating element 208a outward in the vehicle transverse direction.

Figure 13:
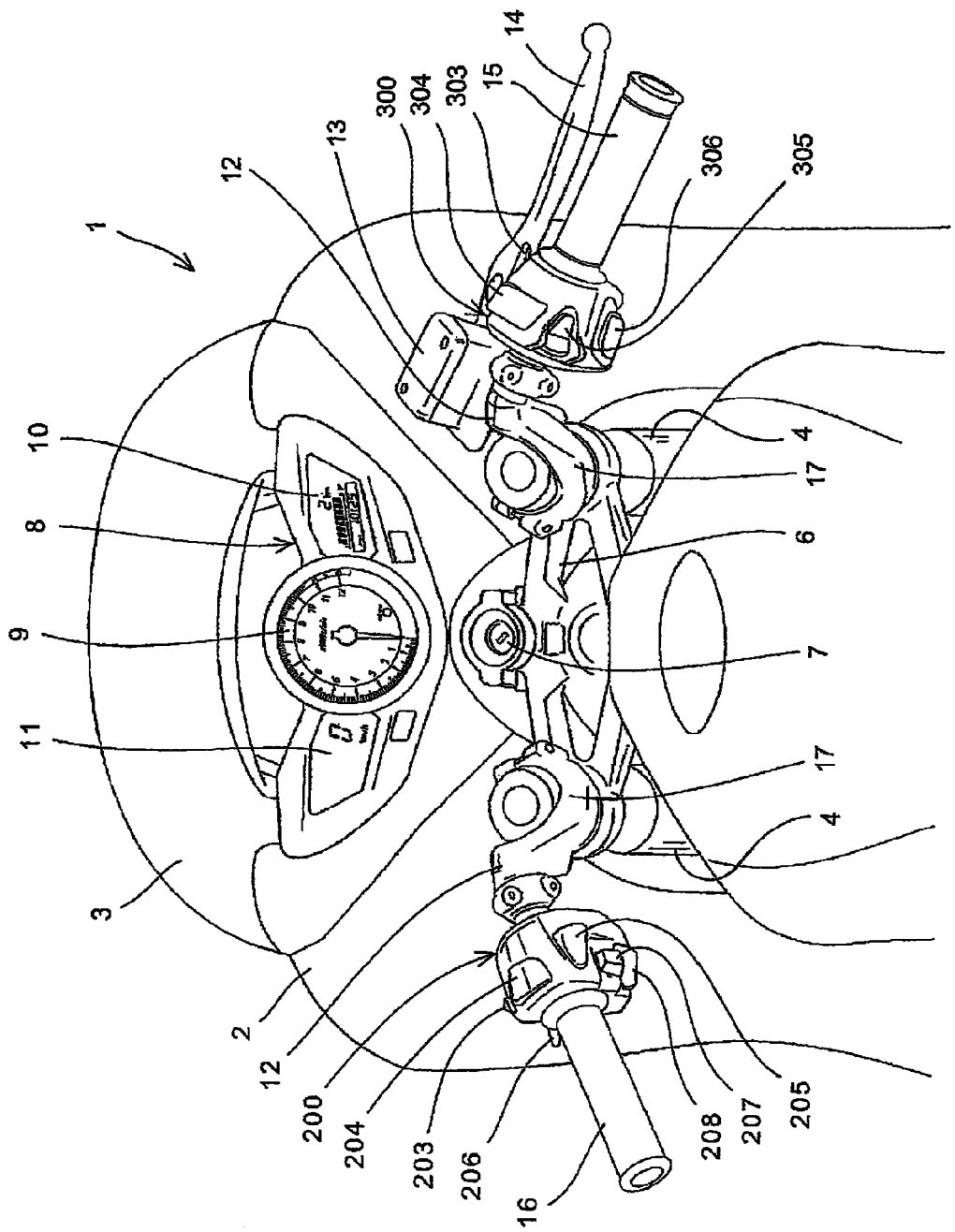
FIG. 13 is a fragmentary enlarged view of a motorcycle 1 to which a handlebar switch assembly according to a second embodiment of the invention is applied.

FIG. 13 is a fragmentary enlarged view of a motorcycle 1 to which a handlebar switch assembly according to the second embodiment of the invention is applied. Since the only differences from FIG. 1 are left and right handlebar switch assemblies, descriptions of the other common parts will be omitted. Handlebar switch assemblies 200 and 300 having operation switches for various electric parts are fitted to the left and right handlebars 12 adjacently to the vehicle center side of the handlebar grips 15 and 16. The left handlebar switch assembly 200 has a headlight optical axis changeover switch 204, a horn switch 205, a turn signal switch 207, a hazard lamp switch 203, and a shift-down switch 208 and a shift-up switch 206 for automatic transmission gear shift. On the other hand, the right handlebar switch assembly 300 has an engine stop switch 304, a neutral/drive changeover switch 305, a starter switch 306 and a run mode changeover switch 303.

Figure 14:
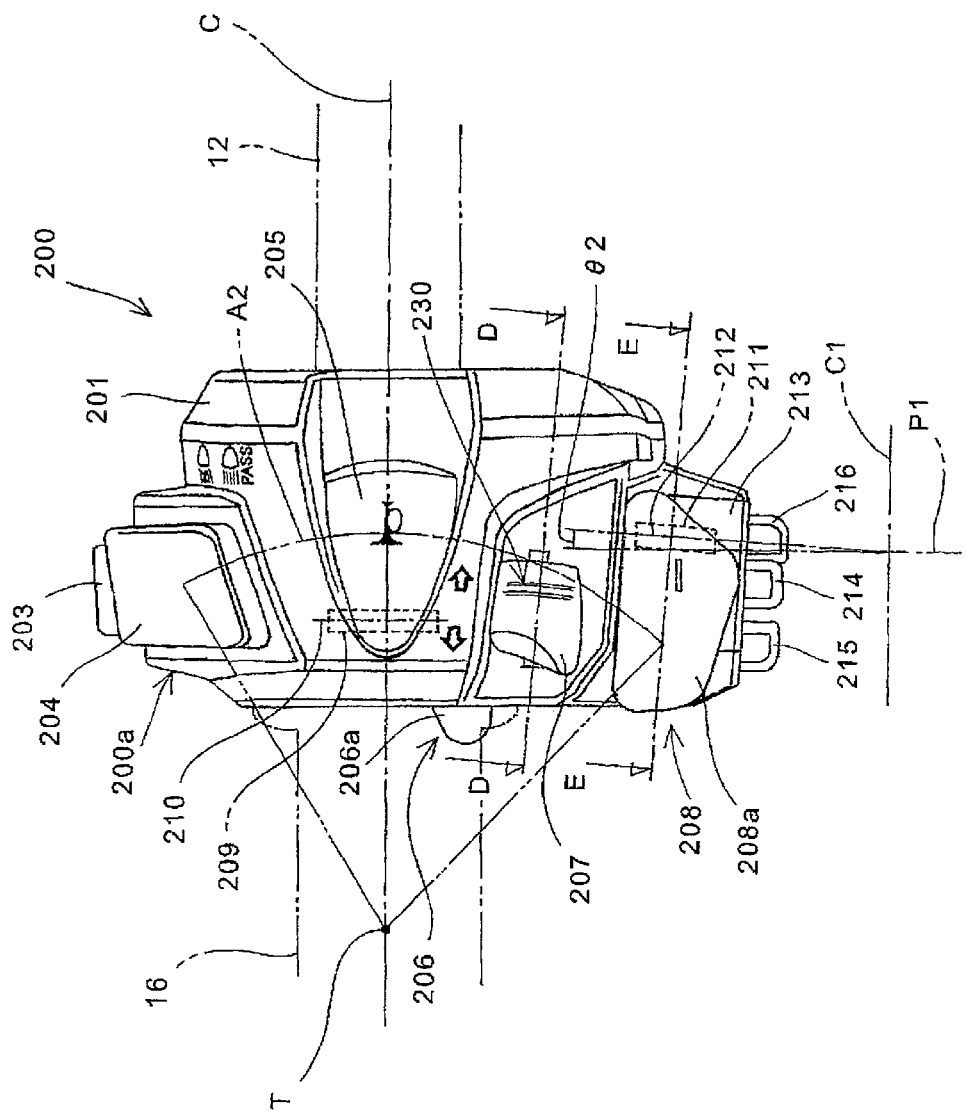
FIG. 14 is a front view of the left handlebar switch assembly.
Figure 15:
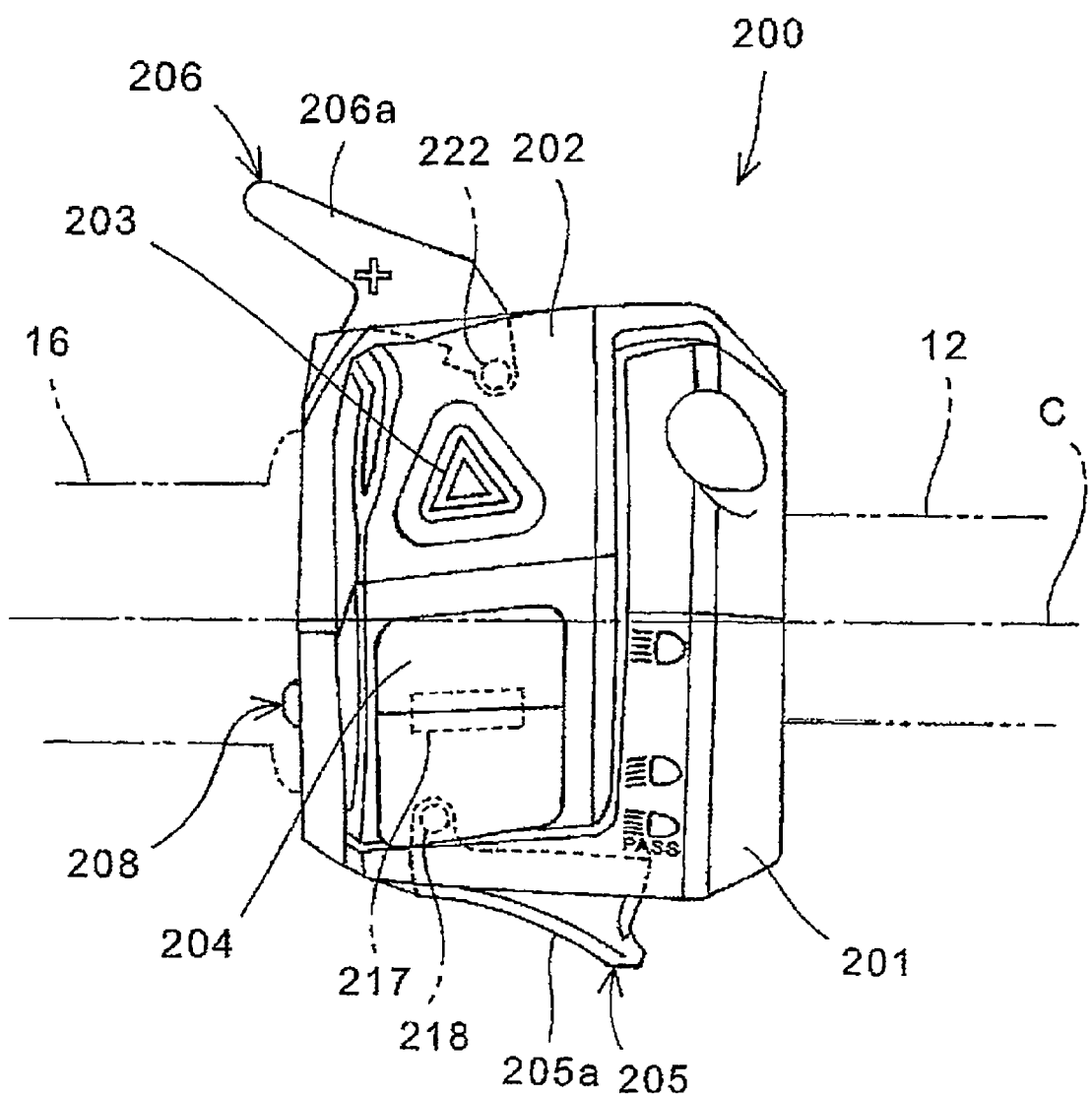
FIG. 15 is a top view of the left handlebar switch assembly.
Figure 16:
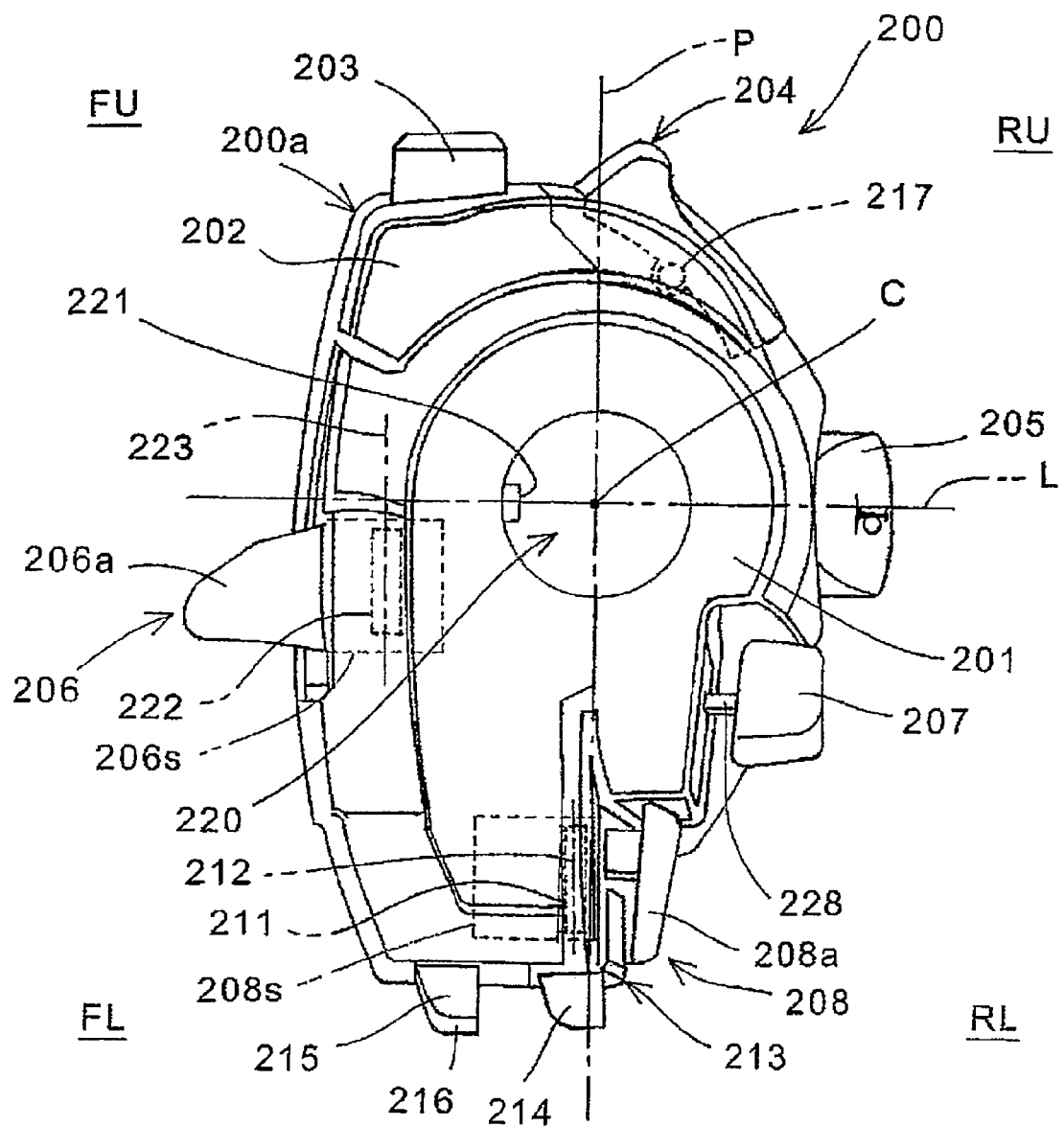
FIG. 16 is a side view of the left switch case as seen from the transversely outward side in the axis line direction of the handlebar.

FIG. 14 is a front view of the left handlebar switch assembly 200. FIG. 15 is a top view of the handlebar switch assembly 200 and FIG. 16 is a side view of the handlebar switch assembly 200 as seen from the transversely outward side in the axis line direction of the handlebar 12. The same reference numerals as above denote the same or equivalent elements. The handlebar switch assembly 200 is structured as a box-like switch case 200a of resin or similar material to which several switches for operation of various electric parts and a shift-up switch (first shift switch) 206 and a shift-down switch (second shift switch) 208 are fitted. The horn switch 205 of the swing push type is located almost at the same height level as the axis line C of the handlebar 12 in the vehicle vertical direction, and the optical axis changeover switch 204 of the seesaw type is located above it. The hazard lamp switch 203, which is turned on or off by making the cylindrical operating element protruded or depressed, is located on the vehicle front side of the optical axis changeover switch 204. Also, the turn signal switch 207, which activates a turn signal lamp by tilting it left or right, is located below the horn switch 205.

The switch case 200a, includes a rear case half 201 on the occupant side and a front case half 202 on the vehicle front side, is fixed in a prescribed place on the handlebar 12 by inserting the handlebar 12 into an insertion hole 220 and fastening both the case halves. The right handlebar switch assembly 300 is also structured in the same way.

The handlebar switch assembly 200 is fixed on the handlebar 12 so that the operating surface of the horn switch 205 faces the occupant. The handlebar switch assembly 200 is fitted by aligning an engaging projection 221 formed on the front case half 202 with a positioning hole (not shown) in the handlebar 12 to engage it with the hole, sandwiching the handlebar 12 between the rear case half 201 and front case half 202 and coupling both the case halves with fixing screws 228 (see FIG. 18).

The shift-up switch 206, which swings around a swing shaft 222, is located on the vehicle front side of the switch case 200a and the shift-down switch 208, which swings around a swing shaft 211, is located below the turn signal switch 207. The shift-up switch 206 (shift-down switch 208) has one end of the operating element 206a (208a) journalled to the swing shaft 222 (211) oriented along the height direction of the switch case 200a and the other end, namely the pushing part, extending outward in the vehicle transverse direction. The centerlines 223 and 212 of the swing shafts are almost parallel to the height direction of the switch case 200a, namely the first imaginary line P.

The swing shaft 211 of the shift-down switch 208 is tilted in a way that the transversely outward side of the operating element 208a is close to the axis line C of the handlebar 12. Concretely, the centerline 212 of the swing shaft 211 is tilted clockwise by a given angle θ2 with respect to an imaginary line P1 perpendicular to an imaginary line C1 parallel to the axis line C when the switch case 200a is seen from the front. In addition, in this embodiment as well, the swing shaft 211 of the shift-down switch 208 may be located in a more rearward position than the imaginary line P.

Figure 22:
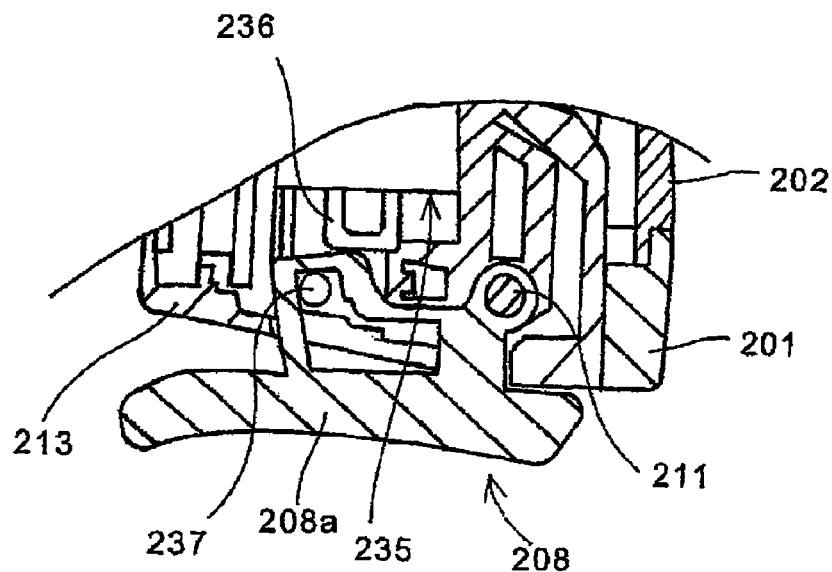
FIG. 22 is a sectional view taken along the line E-E in FIG. 14.

The operating element 208a of the shift-down switch 208 according to this embodiment is so shaped that the vertical dimension of the operating surface increases toward the vehicle inward side and its end on the vehicle inward side extends beyond the swing shaft 211, virtually reaching the vehicle inward end of the horn switch 205 (see FIG. 22). Consequently, the operating surface area of the shift-down switch 208 is larger than the operating surface area of the horn switch 205, improving its operability. The shift-down switch 208 is supported by a switch unit 213 separate from the rear case half 201.

The optical axis changeover switch 204, horn switch 205, turn signal switch 207 and shift-down switch 208 are arranged along the vertical direction of the switch case 200a in a manner that they do not overlap in the axis line C direction of the handlebar 12 and they overlap an arc A2 with the thumb's swing center T as its center. Furthermore, in this embodiment, the swing direction of the turn signal switch 207 is tilted in the same way as the swing shaft 211 of the shift-down switch 208, thereby improving the operability of the turn signal switch 207.

Regarding the positions of both the shift switches when the handlebar switch assembly 200 is seen from the axis line direction of the handlebar 12, like the handlebar switch assembly 40 according to the first embodiment, the shift-up switch 206 is located in the front lower zone FL remotely from the first imaginary line P and adjacently to the second imaginary line L while the shift-down switch 208 is located in the rear lower zone RL adjacently to the first imaginary line P and remotely from the second imaginary line L.

The switch body 206s of the shift-up switch 206 and the switch body 208s of the shift-down switch 208 are each fixed on the front case half 202. Consequently, both the switch bodies 206s and 208s overlap each other when the switch case 200a is seen from above.

The operating element of the hazard lamp switch 203 is in the shape of a triangular pole which matches the triangular mark indicating its function so that the rider can recognize it more easily. The optical axis changeover switch 204 is of the seesaw type which swings around a swing shaft 217 and when it is swung toward the vehicle front side, the headlight is oriented upward (high beam) and when it is swung toward the vehicle rear side, the headlight is oriented downward (low beam). Flashing of the headlight can be done by further pushing it toward the occupant side from its low beam position.

The horn switch 205 swings around the swing shaft 209 provided on its transversely outward end. The centerline 210 of the swing shaft 209 is almost perpendicular to the axis line C and the horn switch 205 is structured to swing by pushing its operating surface on the vehicle inward side toward the vehicle front side. The horn switch 205 is so shaped that its longitudinal side is oriented along the axis line C and its protrusion from the surface of the rear case half 201 increases inward in the vehicle transverse direction.

Drain holes 214, 215, and 216 are formed at the bottom of the switch case 200a in order to drain water in the switch case 200a toward the vehicle rear side. Regarding the three drain holes, the center hole (in a front view) is staggered from the left and right holes in the front-back direction. The drain hole 214, located on the occupant side, is almost flush with the occupant side surface of the switch unit 213 of the shift-down switch 208.

Figure 17:
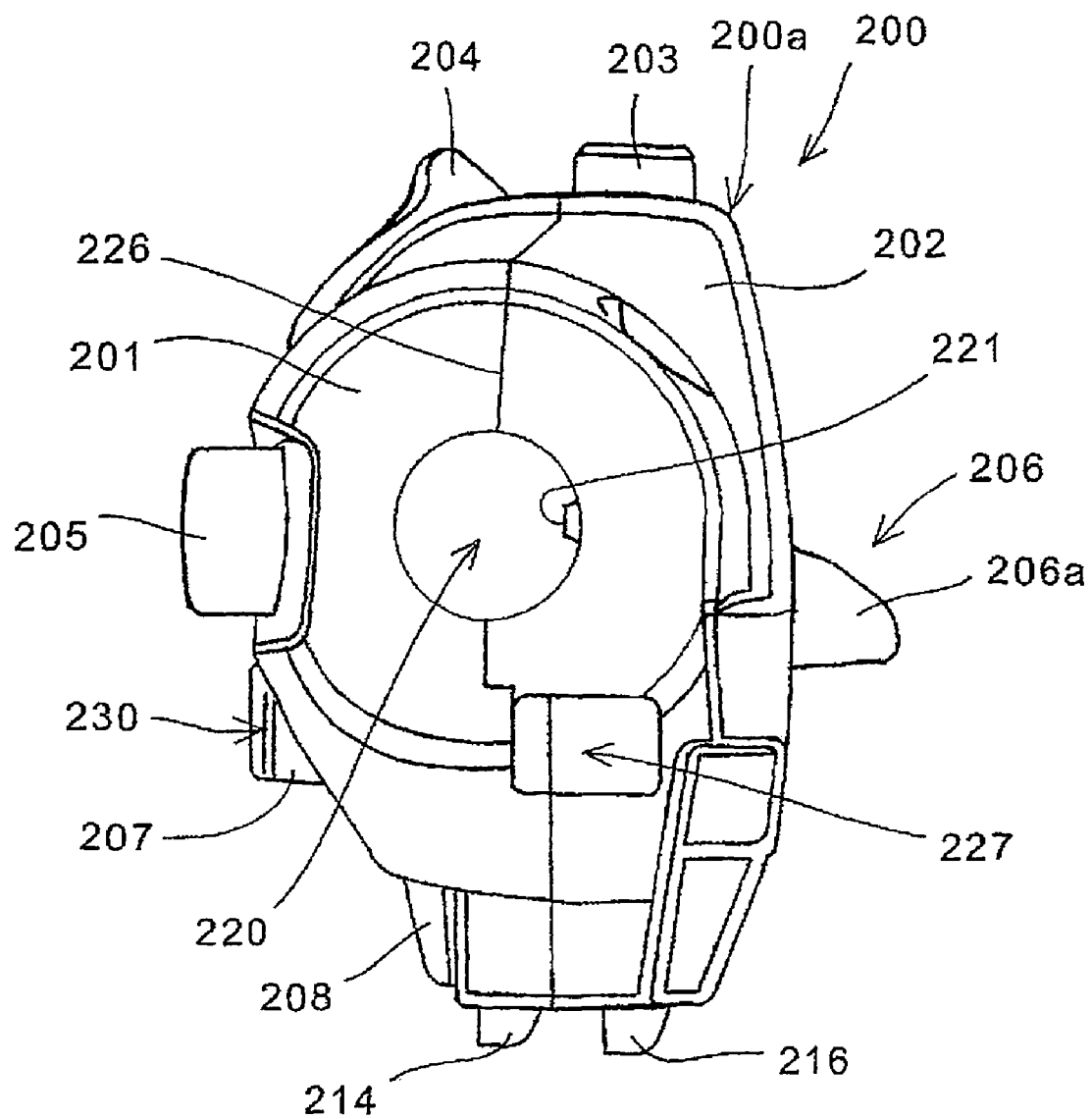
FIG. 17 is a side view of the switch case as seen from the transversely inward side in the axis line direction of the handlebar.
Figure 18:
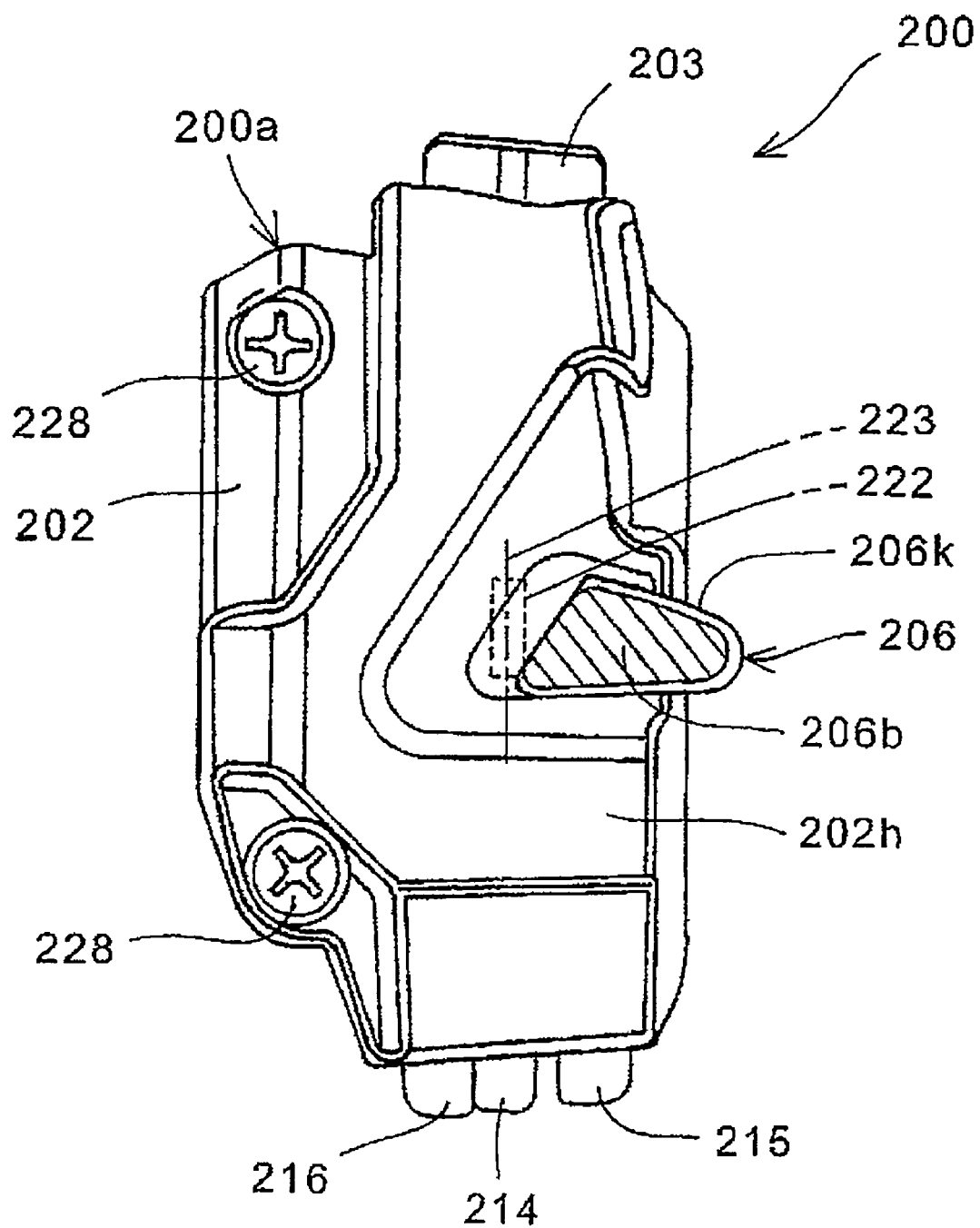
FIG. 18 is a back view of the left switch case.

FIG. 17 is a side view of the switch case 200a as seen from the transversely inward side in the axis line direction of the handlebar 12. FIG. 18 is a back view of the switch case 200a. The same reference numerals as above denote the same or equivalent elements. The rear case half 201 and front case half 202 abut on each other on a division plane 226 and both the halves are coupled by screwing in the two fixing screws 228 oriented along the vehicle longitudinal direction from the front case half 202 side. A harness outlet 227 is formed on the transversely outward side faces of the front case half 202 and rear case half 201.

Referring to FIG. 15, the operating element 206a of the shift-up switch 206 has a virtually triangular operating surface 206b (hatched area in FIG. 18). This operating surface 206b is nearer to the surface 202h of the front case half 202 and larger than in the first embodiment so that high operability can be achieved regardless of forefinger length. A tapered portion 206k, sloped down toward the transversely outward side, is formed on the upper surface of the operating element 206a. Therefore, it is easy to put the forefinger on the tapered portion 206k and the vertical dimension of the operating surface 206b increases toward the forefinger tip, so operation with the fingertip is easier.

Figure 19:
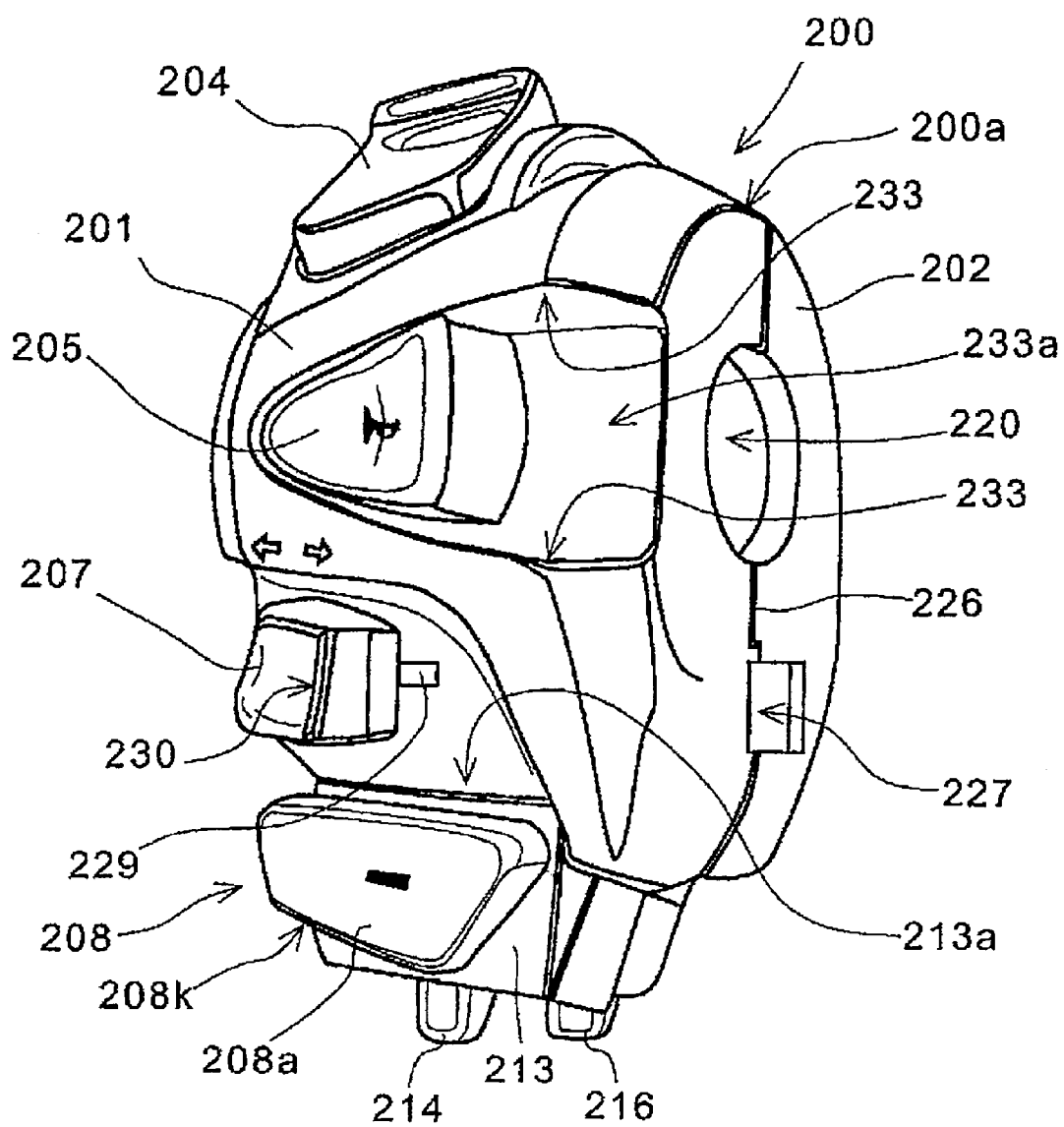
FIG. 19 is a perspective view of the left handlebar switch assembly as seen from the occupant side and vehicle inward side.
Figure 20:
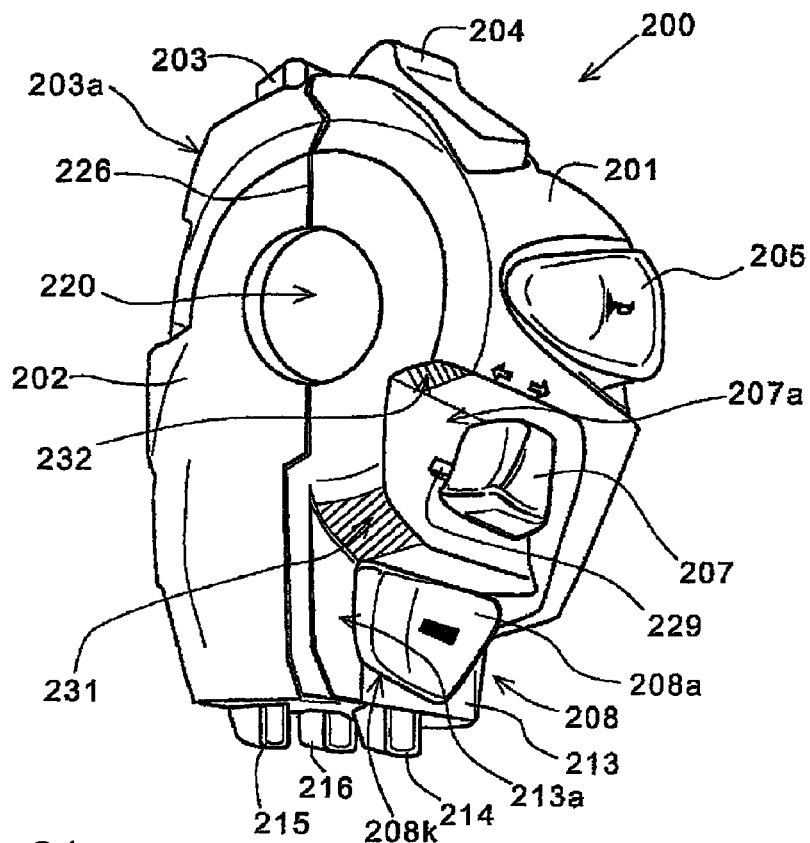
FIG. 20 is a perspective view of the left handlebar switch assembly as seen from the occupant side and vehicle outward side.

FIG. 19 is a perspective view of the handlebar switch assembly 200 as seen from the occupant side and vehicle inward side. FIG. 20 is a perspective view of the handlebar switch assembly 200 as seen from the occupant side and vehicle outward side. The same reference numerals as above denote the same or equivalent elements. On the rear case half 201, a bottom surface 233a, the height of which becomes almost the same as the operating surface of the horn switch 205 when the horn switch 205 is pushed, is formed on the vehicle inward side of the horn switch 205. The upper and lower walls 233 thus formed function as guides to prevent the thumb from moving up or down when operating the horn switch 205.

The turn signal switch 207 according to this embodiment, as mentioned above, not only does the turn signal switch 207 swing in a way to match the orientation of the thumb but also the ridge line of the operating knob of the turn signal switch 207 on the occupant side and transversely inward side has a knurled groove 230 to prevent slippage. The structure of the turn signal switch 207 is described below referring to FIG. 21 as well.

Figure 21:
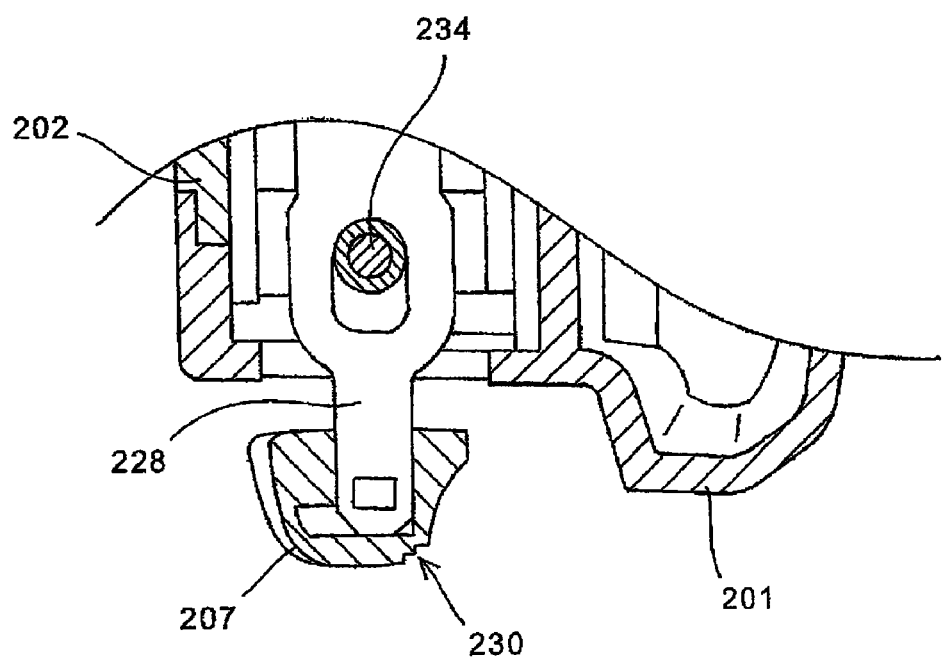
FIG. 21 is a sectional view taken along the line D-D in FIG. 14.

FIG. 21 is a sectional view taken along the D-D line in FIG. 14. The turn signal switch 207 has a push cancel structure which supports a virtually box-like operating knob, has an arm 228 which swings around a swing shaft 234 and turns on the turn signal lamp when tilted left or right and turns it off when pushed toward the vehicle front side. Since the turn signal switch 207 is designed to be operated with the left hand's thumb, a pushing force is applied to the operating knob to tilt it right and a pulling force is applied to tilt it left. Therefore, if the turn signal switch designed to be tilted left and right is used for a vehicle in which the drop angle of the handlebar 12 is relatively large, for example, a sport vehicle with the handlebar 12 directly attached to the front fork 4, the opening angle between the thumb and forefinger must be sufficiently large, which may make it particularly difficult to apply a pulling force. In this embodiment, in order to address this problem, two knurled grooves 230 with an angular cross section are formed in a place where the ball of the thumb rests when the operating knob is tilted left, thereby improving the operability of the turn signal switch 207 in the pulling direction. The transversely outward side face of the operating knob is tilted to receive the rightward pushing force. This also improves the operability in tilting to the right.

Referring back to FIGS. 19 and 20, the shift-down switch 208 is housed in the dent 213a made at the bottom of the switch case 200a outward in the vehicle transverse direction. The dent 213a has such a shape that when the front case 200a is viewed from the front, a virtually rectangular solid is cut off from its bottom. In this dent 213a, the surface opposite to the upper surface of the operating element 208a has a tilted surface 231 whose distance from the operating element 208a increases outward in the vehicle transverse direction. Due to this tilted surface 231, the thumb hardly gets caught when the shift-down switch 208 is operated, permitting a smoother operation. In the dent 207a which houses the turn signal switch 207, the surface opposite to the upper surface of the turn signal switch 207 also has a tilted surface 232 which produces a similar effect.

FIG. 22 is a sectional view taken along the line E-E in FIG. 14. The same reference numerals as above denote the same or equivalent elements. As mentioned above, the shift-down switch 208 is supported by the switch unit 213 separate from the rear case half 201. When the shift-down switch 208 is operated, the operating element 208a swings around the swing shaft 211, which pushes an actuating element 236 of the micro switch 235, thereby transmitting a shift-down signal. On the other hand, as the occupant decreases his/her operating force, the operating element returns to its initial position where it abuts on the stopper 237, by the elastic force of an elastic member, etc. The shift-up switch 206 is also structured in the same way.

Figure 23:
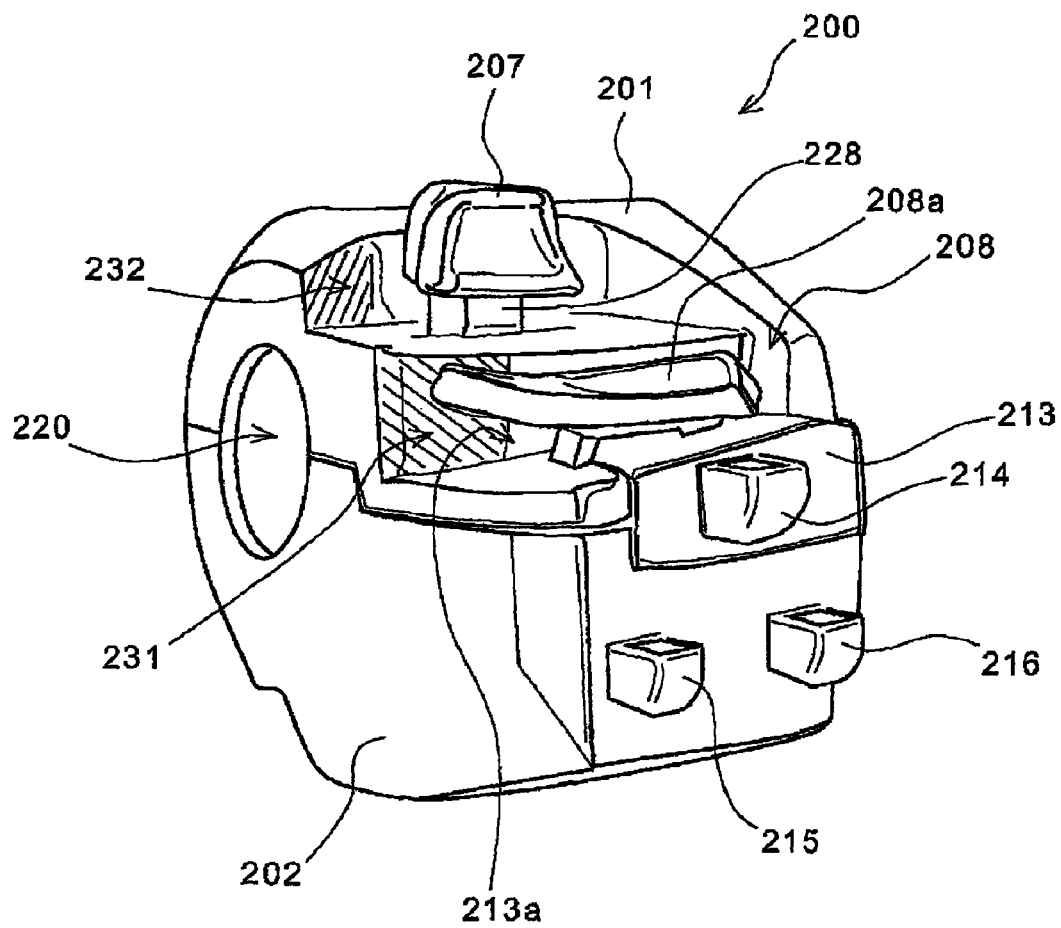
FIG. 23 is a perspective view of the left handlebar switch assembly as seen from below.

FIG. 23 is a perspective view of the handlebar switch assembly 200 as seen from below. Among the three drain holes 214, 215, and 216 on the bottom surface of the handlebar switch assembly 200, the two ones on the vehicle front side are formed on the front case half 202 while the drain hole 214 on the vehicle rear side is provided on the bottom surface of the switch unit 213 of the shift-down switch 208 and is virtually flush with the rear surface of the switch unit 213. This arrangement is intended to protect the micro switch 235 (see FIG. 22) which should have a high degree of water resistance because it is to send a signal to the ECU directly. If water enters the switch case 200a during operation of the vehicle, though the water tends to gather in a place on the vehicle rear and lower side of the switch case 200a, namely in a place where the switch unit 213 is located, the drain hole 214, structured as mentioned above, allows the water to be directly drained from the switch unit 213, preventing the water from affecting the micro switch 235.

Figure 24:
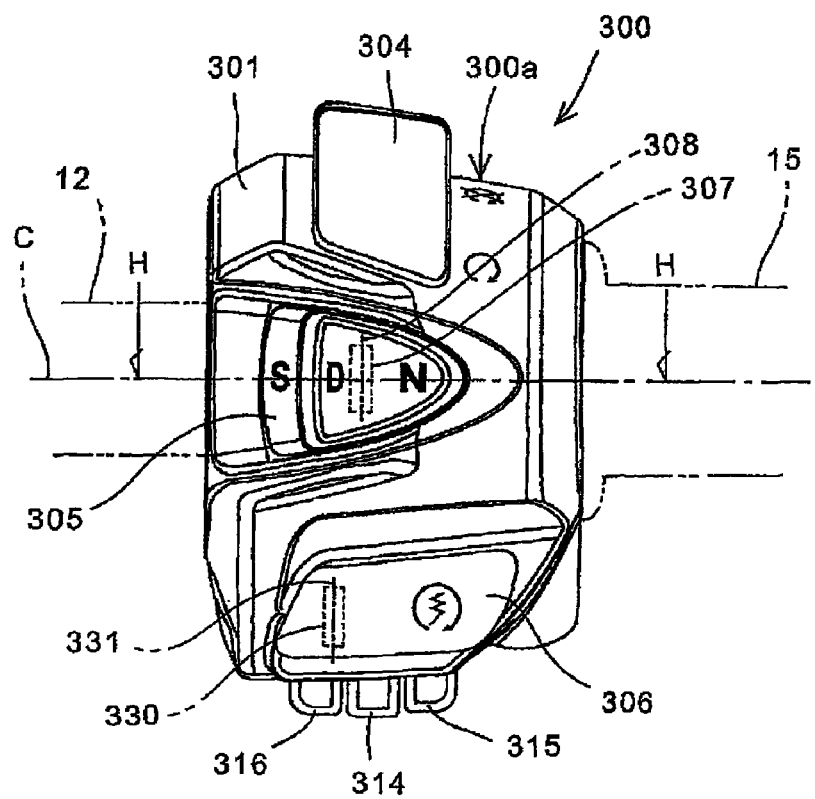
FIG. 24 is a front view of the right handlebar switch assembly.
Figure 25:
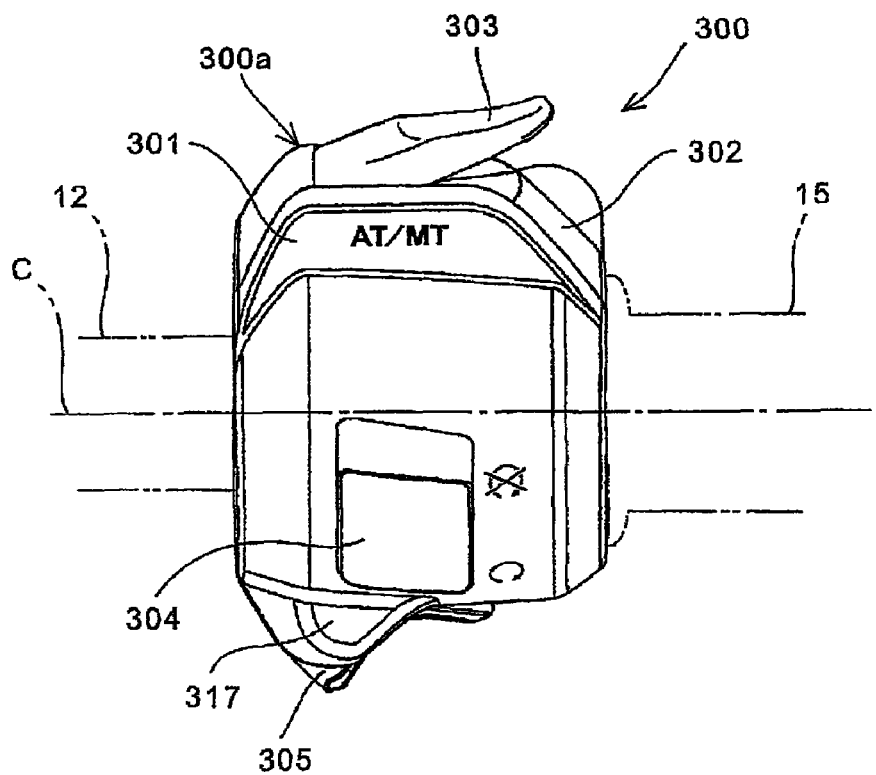
FIG. 25 is a top view of the right handlebar switch assembly.

FIG. 24 is a front view of the right handlebar switch assembly 300. FIG. 25 is a top view of the same. The handlebar switch assembly 300 is structured as a box-like switch case 300a of resin or similar material to which several switches for operation of various electric parts are fitted. The run mode changeover switch 303, which is located on the vehicle front side and of the swing push type (returns to the initial position upon release of a pushing force), is operated by pulling it (toward the occupant side) with the forefinger of the right hand and each time it is operated, switching is made between the automatic run mode and the semiautomatic run mode. The engine stop switch 304, which is of the seesaw type, is used to stop the operation of the igniter by turning it to the off position during operation of the engine for emergency stop of the engine.

The neutral/drive changeover switch 305, which is almost at the same height level as the axis line of the handlebar 12 in the vehicle vertical direction, is of the seesaw push type (returns to the neutral position upon release of a pushing force) which swings around a swing shaft 307 so that when the motorcycle 1 is at a stop, switching is made between the neutral (N) and first speed (D) positions by pushing the D side or N side with the thumb. Furthermore, the neutral/drive changeover switch 305 has such a function that when the D side is further pushed while the automatic run mode is chosen, the mode is changed to a sport automatic run mode (S mode) in which the driving force is more emphasized than in the normal automatic run mode. Partition plates 317 are provided on the top and bottom of the neutral/drive changeover switch 305 in order to guide the thumb for correct operation. Also, the swing shaft 307 of the neutral/drive changeover switch 305 is disposed so that its centerline 308 is oriented along the vehicle vertical direction.

The push type starter switch 306, located in the lowest position of the handlebar switch assembly 300, is of the swing push type which swings around a swing shaft 330 and the swing shaft 330 is located so that its centerline 331 is oriented along the vehicle vertical direction. Drain holes 314, 315, and 316 are formed at the bottom of the switch case 300a in order to drain water in the switch case 300a toward the vehicle rear side. Regarding the three drain holes, the center hole (in a front view) is staggered from the left and right holes in the front-back direction.

Figure 26:
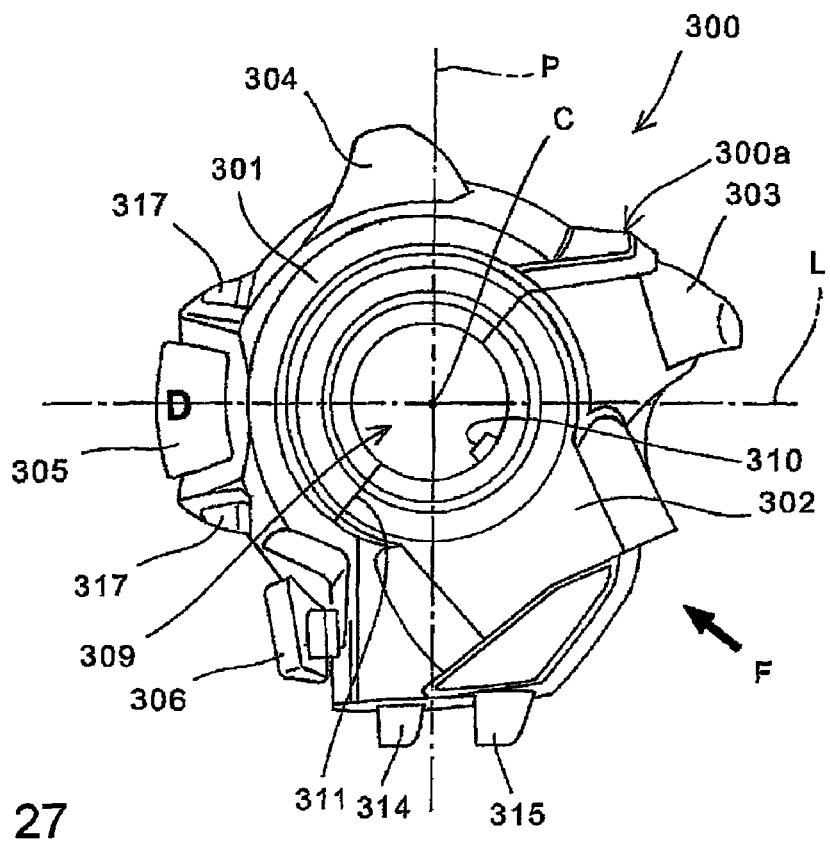
FIG. 26 is a side view of the right handlebar switch assembly as seen from the transversely outward side in the axis line direction of the handlebar.
Figure 27:
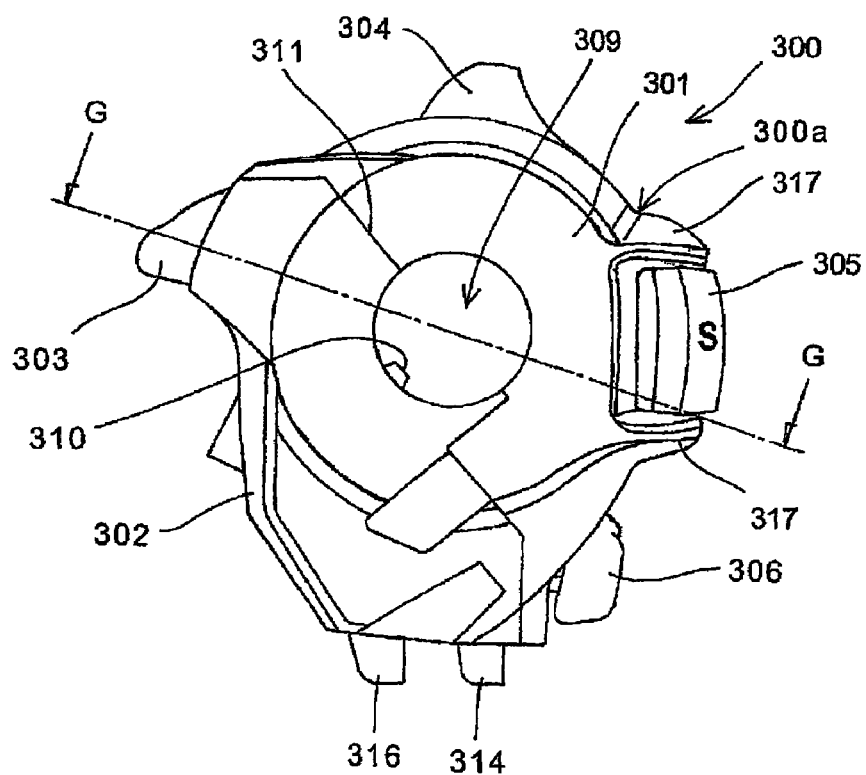
FIG. 27 is a side view of the right handlebar switch assembly as seen from the transversely inward side in the axis line direction of the handlebar.
Figure 28:
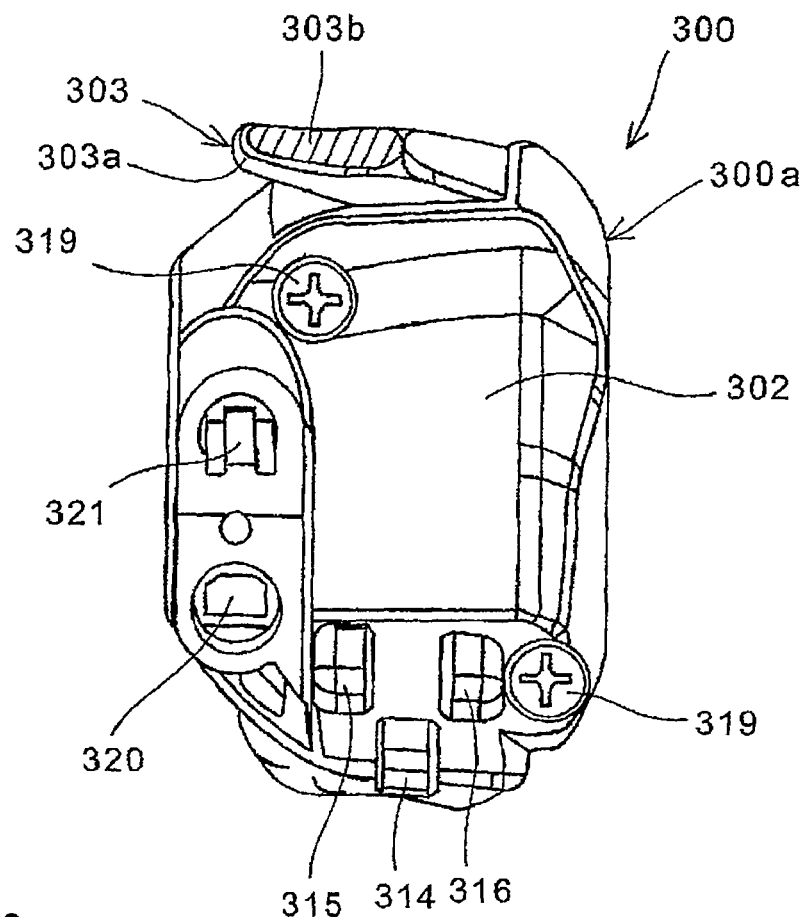
FIG. 28 is a view taken from direction F in FIG. 26.

FIG. 26 is a side view of the handlebar switch assembly 300 as seen from the transversely outward side in the axis line direction of the handlebar 12. FIG. 27 is a side view of the handlebar switch assembly 300 as seen from the transversely inward side in the axis line direction of the handlebar 12, and FIG. 28 is a view taken from direction F in FIG. 26.

The rear case half 301 and front case half 302 abut on each other on a division plane 311 and both the halves are coupled by screwing in the two fixing screws 319 (see FIG. 28) oriented along the vehicle longitudinal direction from the front case half 302 side. Throttle cable outlets 320 and 321 are formed in a transversely outward place on the front case half 302.

While the shift-up switch 206 of the left handlebar switch assembly 200 is located below the second imaginary line L in the vehicle vertical direction, the run mode changeover switch 303 is above the second imaginary line L in the vehicle vertical direction. Also while the shift-down switch 208 is adjacent to the first imaginary line P, the starter switch 306 is remote from the first imaginary line P. This difference in switch layout between the left and right assemblies is made for the following reasons: for example, while the left handlebar switch assembly 200 is designed to allow the rider to operate the shift-up switch 206 and shift-down switch 208 without changing his/her gripping position during a run, with the right handlebar switch assembly 300 the rider may operate the run mode changeover switch 303 while operating the throttle and it is less likely that the starter switch 306 and run mode changeover switch 303 are operated simultaneously.

Figure 29:
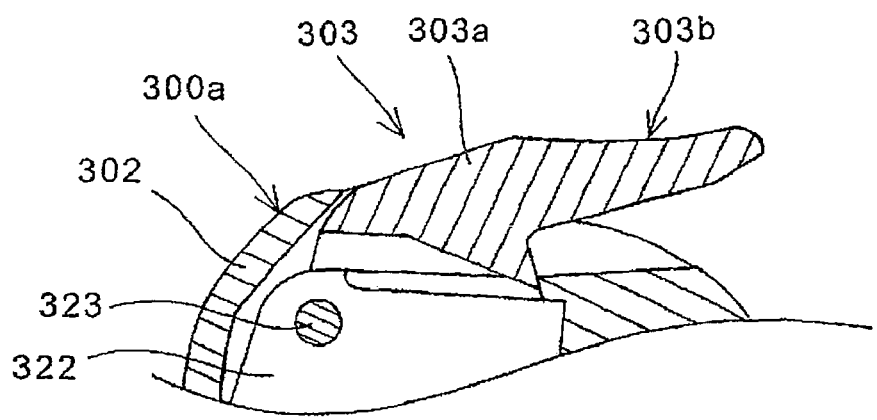
FIG. 29 is a sectional view taken along the line G-G in FIG. 27.

Referring to FIG. 29, the structure of the run mode changeover switch 303 is explained below. FIG. 29 is a sectional view taken along the line G-G in FIG. 27. The switch unit 322 of the run mode changeover switch 303 is adjacent to the transversely inward wall surface of the front case half 302. Also the swing shaft 323 of the switch unit 322 is located on the vehicle inward side of the switch case 300a, so that the end-to-end distance of an operating element 303a is long. The operating element 303a is so shaped that the vertical dimension of its operating surface 303b decreases toward the vehicle outward side and it is easy to operate with a fingertip.

Figure 30:
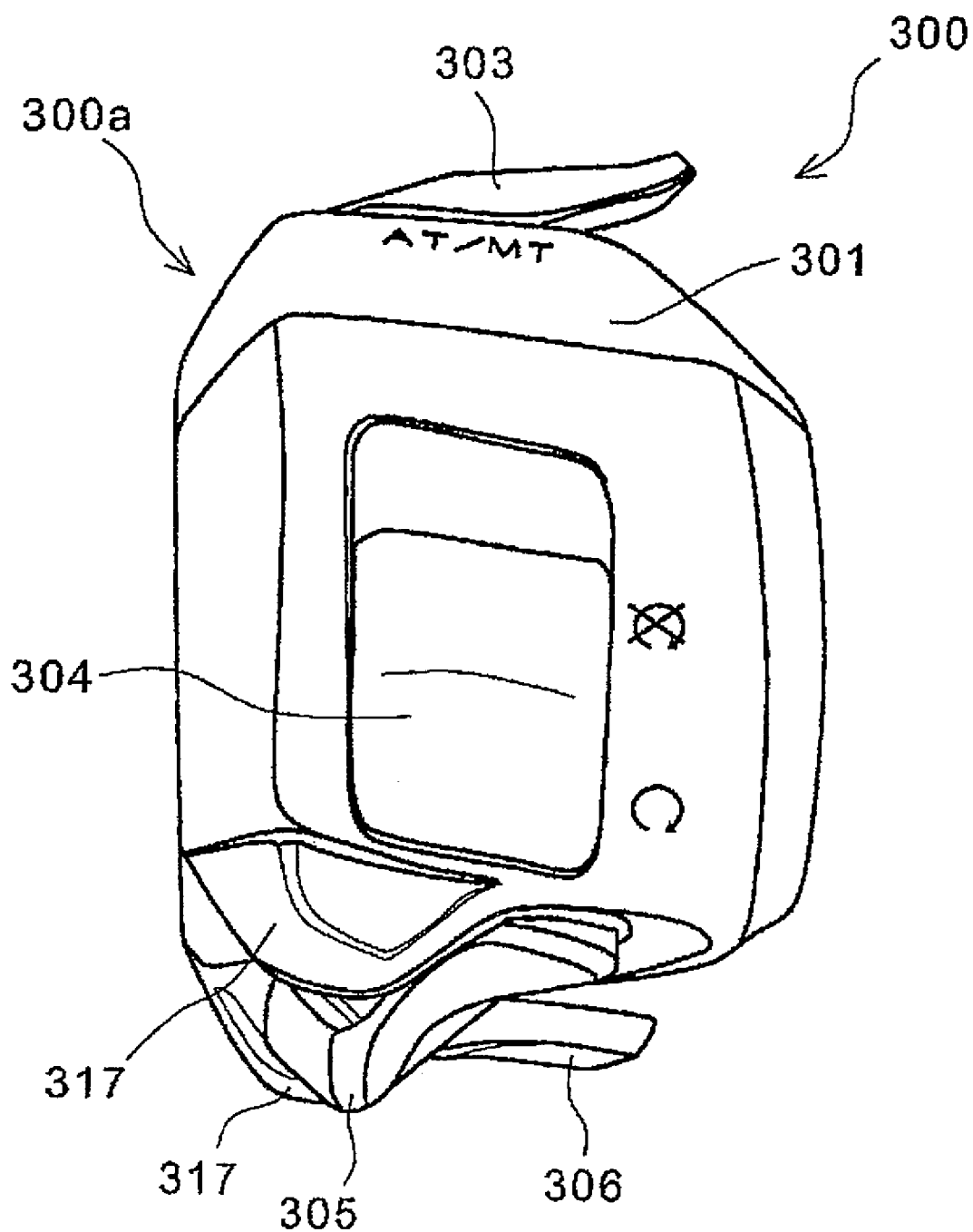
FIG. 30 is a perspective view of the right switch case as seen from above.
Figure 31:
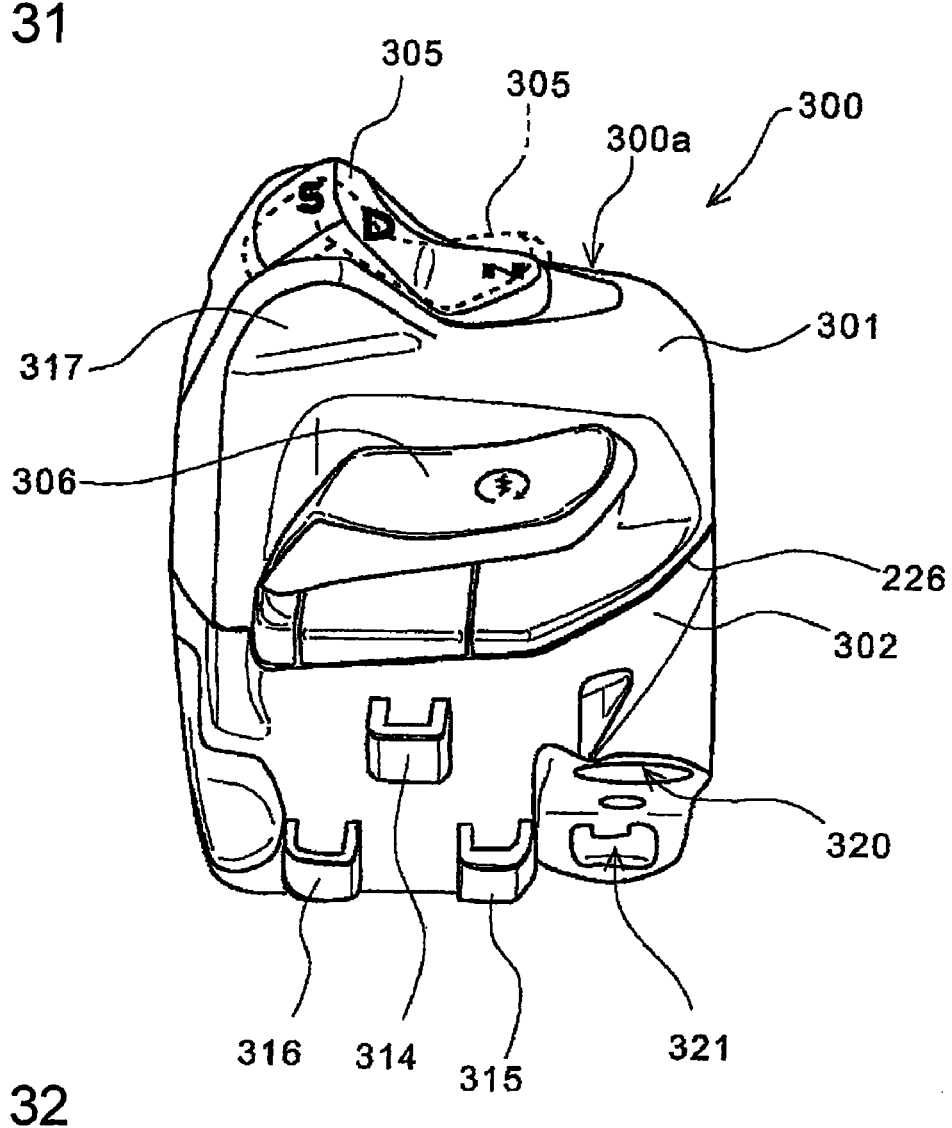
FIG. 31 is a perspective view of the right switch case as seen from below.
Figure 32:
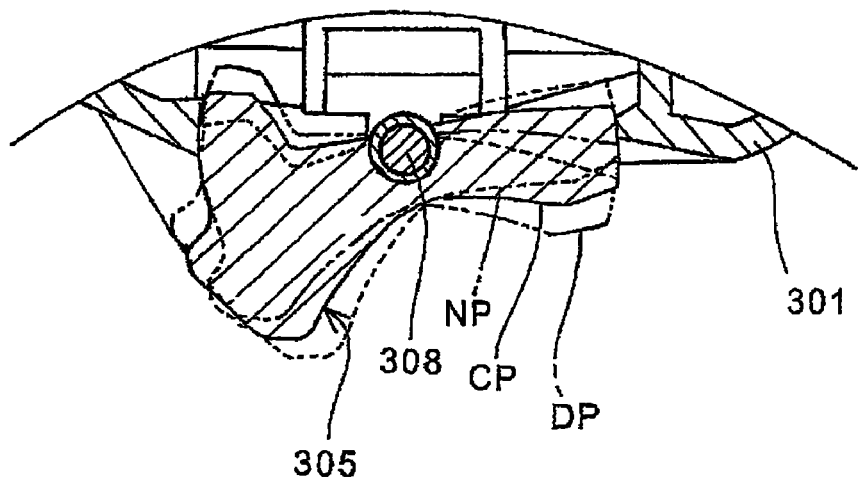
FIG. 32 is a sectional view taken along the line H-H in FIG. 24.

FIG. 30 is a perspective view of the switch case 300a as seen from above. FIG. 31 is a perspective view of the switch case 300a as seen from below and FIG. 32 is a sectional view taken along the line H-H in FIG. 24. The same reference numerals as above denote the same or equivalent elements. The neutral/drive changeover switch 305 is so shaped that its transversely inward end protrudes toward the occupant side and the D side operating surface is oriented outward in the vehicle transverse direction. Consequently it is easy to push the D side which is remoter from the thumb than the N side. A partition plate 317 formed on the rear case half 302 has a function to prevent the neutral/drive changeover switch 305 from swinging toward the D side unless the occupant operates it so intentionally. As illustrated in FIG. 32, the neutral/drive changeover switch 305 is in a neutral position CP when the occupant does not apply an operating force to it and is structured so that it can swing toward the N side until it reaches its neutral position NP and toward the D side until it reaches its drive position DP.

Referring to FIG. 31, the three drain holes 314, 315, and 316 in the switch case 300a are all formed on the front case half 302. The center drain hole 314 is not flush with the vehicle rear side face like the left switch case 200a. This structural difference from the switch case 200a is made because the starter switch 306 does not require a high water resistance relative to the shift-down switch 208. Due to this structural difference, the rear lower part of the right switch case 300a is structurally simpler than that of the left switch case 200a.

The structure and shape of the switch case, the positions and shapes of the shift-up switch and shift-down switch, the shapes of the operating elements, and the positions and types of the other switches and so on are not limited to those in the above embodiment but may be modified in various ways. For example, in the above embodiment, the shift-up switch and shift-down switch are provided in the left handlebar switch assembly; however, both the shift switches may be provided in the right handlebar switch assembly. The handlebar switch assembly according to the present invention can be applied regardless of the switch case shape, vehicle type and son on and may be applied to three-wheeled vehicles or four-wheeled vehicles having handlebars.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handlebar switch assembly adapted to be fixed on a handlebar of a motorcycle, in which a first shift switch and a second shift switch for transmission gear shifting are separately provided on a switch case having a plurality of switches for operation of various electric parts, comprising:
dividing the switch case into four zones when viewed from an axis line direction of the handlebar, a rear upper zone and a rear lower zone, both located opposite to an occupant with respect to the axis line, and a front upper zone and a front lower zone, both located on a vehicle front side;
the first shift switch and the second shift switch are swing-type switches in which operating elements swing when a pushing force is applied;
the first shift switch for either shift-up or shift-down operation is located in the front lower zone so as to orient one end of the operating element outwardly in a vehicle transverse direction; and
the second shift switch for the shift-down or shift-up operation is located in the rear lower zone so as to orient one end of the operating element outwardly in the vehicle transverse direction,
wherein the second shift switch and the plurality of switches are arranged on the switch case fitted to the handlebar on a left side in a vehicle transverse direction from above in a following order: an optical axis changeover switch, a horn switch, a turn signal switch and the second shift switch; and
the horn switch is a swing-type switch which swings around a swing shaft located near the handlebar toward a side of the axis line of the handlebar, a pushing surface of the horn switch being formed to project toward an occupant side and to gradually increase toward a vehicle center from a swing shaft side.

2. The handlebar switch assembly according to claim 1, wherein:
for formation of the four zones, a first imaginary line for division between an occupant side and a vehicle front side and a second imaginary line perpendicular to the first imaginary line for division between a vehicle upper side and a vehicle lower side are defined;
the first shift switch is remote from the first imaginary line and adjacent to the second imaginary line; and
the second shift switch is adjacent to the first imaginary line and remote from the second imaginary line.

3. The handlebar switch assembly according to claim 2, wherein when the axis line of the handlebar, the first imaginary line and the second imaginary line are perpendicular to each other and a direction of the first imaginary line is defined as a height direction of the switch case and a direction of the second imaginary line is defined as a front-back direction of the switch case;
swing shafts of the first shift switch and the second shaft switch are oriented along the height direction of the switch case.

4. The handlebar switch assembly according to claim 3, wherein when the switch case is seen from a vehicle rear side, the swing shaft of the second shift switch is tilted by a given angle with respect to the first imaginary line so as form a tip of the operating element of the second shift switch to be close to the axis line of the handlebar.

5. The handlebar switch assembly according to claim 4, wherein the switch case comprises a front case half located on the vehicle front side and a rear case half located on the occupant side;
switch bodies of the first shift switch and the second shift switch are each fixed on the front case half on the vehicle front side with respect to the first imaginary line; and
the swing shaft of the second shift switch is located on the vehicle rear side with respect to the first imaginary line.

6. The handlebar switch assembly according to claim 1, wherein the plurality of switches for operation of various electric parts at least include an optical axis changeover switch for headlight, a horn switch and a turn signal switch and are arranged in a vertical direction of the switch case so as not to overlap each other in the axis line direction of the handlebar; and among the plurality of switches the switch adjacent to the second shift switch is operated in a manner different from a manner in which the second shift switch is operated.

7. The handlebar switch assembly according to claim 2, wherein the plurality of switches for operation of various electric parts at least include an optical axis changeover switch for headlight, a horn switch and a turn signal switch and are arranged in a vertical direction of the switch case so as not to overlap each other in the axis line direction of the handlebar; and among the plurality of switches the switch adjacent to the second shift switch is operated in a manner different from a manner in which the second shift switch is operated.

8. The handlebar switch assembly according to claim 4, wherein the plurality of switches for operation of various electric parts at least include an optical axis changeover switch for headlight, a horn switch and a turn signal switch and are arranged in a vertical direction of the switch case so as not to overlap each other in the axis line direction of the handlebar; and among the plurality of switches the switch adjacent to the second shift switch is operated in a manner different from a manner in which the second shift switch is operated.

9. The handlebar switch assembly according to claim 1, wherein the operating element of the second shift switch is housed in a dent made in a bottom of the switch case projecting outwardly in the vehicle transverse direction so as not to protrude toward the occupant side and downward from a surface of the switch case.

10. The handlebar switch assembly according to claim 2, wherein the operating element of the second shift switch is housed in a dent made in a bottom of the switch case projecting outwardly in the vehicle transverse direction so as not to protrude toward the occupant side and downward from a surface of the switch case.

11. The handlebar switch assembly according to claim 4, wherein the operating element of the second shift switch is housed in a dent made in a bottom of the switch case projecting outwardly in the vehicle transverse direction so as not to protrude toward the occupant side and downward from a surface of the switch case.

12. The handlebar switch assembly according to claim 9, wherein among surfaces constituting the dent, a wall surface opposite to an upper surface of the operating element of the second shift switch has a tilted surface whose distance from the operating element increases outward in the vehicle transverse direction.

13. The handlebar switch assembly according to claim 1, wherein at least one of the first shift switch and the second shift switch has a tapered portion in which a height of the operating element decreases outward in the vehicle transverse direction.

14. The handlebar switch assembly according to claim 2, wherein at least one of the first shift switch and the second shift switch has a tapered portion in which a height of the operating element decreases outward in the vehicle transverse direction.

15. A handlebar switch assembly adapted to be fixed on a handlebar of a motorcycle, in which a first shift switch and a second shift switch for transmission gear shifting are separately provided on a switch case having a plurality of switches for operation of various electric parts, comprising:

dividing the switch case into four zones when viewed from an axis line direction of the handlebar, a rear upper zone and a rear lower zone, both located opposite to an occupant with respect to the axis line, and a front upper zone and a front lower zone, both located on a vehicle front side;

the first shift switch and the second shift switch are swing-type switches in which operating elements swing when a pushing force is applied;

the first shift switch for either shift-up or shift-down operation is located in the front lower zone so as to orient one end of the operating element outwardly in a vehicle transverse direction; and the second shift switch for the shift-down or shift-up operation is located in the rear lower zone so as to orient one end of the operating element outwardly in the vehicle transverse direction, wherein the plurality of switches for operation of various electric parts at least include an optical axis changeover switch for headlight, a horn switch and a turn signal switch and are arranged in a vertical direction of the switch case so as not to overlap each other in the axis line direction of the handlebar; and among the plurality of switches the switch adjacent to the second shift switch is operated in a manner different from a manner in which the second shift switch is operated.

16. The handlebar switch assembly according to claim 15, wherein when the axis line of the handlebar, the first imaginary line and the second imaginary line are perpendicular to each other and a direction of the first imaginary line is defined as a height direction of the switch case and a direction of the second imaginary line is defined as a front-back direction of the switch case;

swing shafts of the first shift switch and the second shaft switch are oriented along the height direction of the switch case.

17. The handlebar switch assembly according to claim 15, wherein the plurality of switches for operation of various electric parts at least include an optical axis changeover switch for headlight, a horn switch and a turn signal switch and are arranged in a vertical direction of the switch case so as not to overlap each other in the axis line direction of the handlebar; and among the plurality of switches the switch adjacent to the second shift switch is operated in a manner different from a manner in which the second shift switch is operated.

18. A handlebar switch assembly adapted to be fixed on a handlebar of a motorcycle, in which a first shift switch and a second shift switch for transmission gear shifting are separately provided on a switch case having a plurality of switches for operation of various electric parts, comprising:

dividing the switch case into four zones when viewed from an axis line direction of the handlebar, a rear upper zone and a rear lower zone, both located opposite to an occupant with respect to the axis line, and a front upper zone and a front lower zone, both located on a vehicle front side;

the first shift switch and the second shift switch are swing-type switches in which operating elements swing when a pushing force is applied;

the first shift switch for either shift-up or shift-down operation is located in the front lower zone so as to orient one end of the operating element outwardly in a vehicle transverse direction; and the second shift switch for the shift-down or shift-up operation is located in the rear lower zone so as to orient one end of the operating element outwardly in the vehicle transverse direction, wherein for formation of the four zones, a first imaginary line for division between an occupant side and a vehicle front side and a second imaginary line perpendicular to the first imaginary line for division between a vehicle upper side and a vehicle lower side are defined;

the first shift switch is remote from the first imaginary line and adjacent to the second imaginary line; and the second shift switch is adjacent to the first imaginary line and remote from the second imaginary line.

19. The handlebar switch assembly according to claim 18, wherein when the axis line of the handlebar, the first imaginary line and the second imaginary line are perpendicular to each other and a direction of the first imaginary line is defined as a height direction of the switch case and a direction of the second imaginary line is defined as a front-back direction of the switch case;

swing shafts of the first shift switch and the second shaft switch are oriented along the height direction of the switch case.

20. The handlebar switch assembly according to claim 18, wherein the plurality of switches for operation of various electric parts at least include an optical axis changeover switch for headlight, a horn switch and a turn signal switch and are arranged in a vertical direction of the switch case so as not to overlap each other in the axis line direction of the handlebar; and among the plurality of switches the switch adjacent to the second shift switch is operated in a manner different from a manner in which the second shift switch is operated.

* * * * *